United States Patent [19]
McCarthy

[11] Patent Number: 5,567,006
[45] Date of Patent: Oct. 22, 1996

[54] VEHICLE SEAT WITH ARTICULATED SECTIONS

[76] Inventor: Joseph McCarthy, 1725 North Talbot, R.R. #1, Windsor, Ontario, Canada, N9A 6J3

[21] Appl. No.: 130,579

[22] Filed: Oct. 1, 1993

[51] Int. Cl.$^6$ .................................................. B60N 2/42
[52] U.S. Cl. .................. 297/216.15; 297/216.1; 297/216.16
[58] Field of Search ............... 297/216.1, 216.15, 297/284.1, 284.3, 284.11, 317, 318, 322, 464, 473, 469, 480, 216.19, 216.18; 296/68.1, 65.1

[56] References Cited

U.S. PATENT DOCUMENTS

| | | | |
|---|---|---|---|
| 2,725,921 | 12/1955 | Markin | 155/9 |
| 2,736,566 | 2/1956 | Hartl | 280/29 |
| 2,796,112 | 6/1957 | Barsky | 155/9 |
| 2,943,866 | 7/1960 | Witter | 280/150 |
| 3,427,070 | 2/1969 | Wallach | 297/216 |
| 3,556,584 | 1/1971 | Simon | 296/65 |
| 3,591,232 | 7/1971 | Simon | 297/216 |
| 3,697,128 | 10/1972 | Strien et al. | 297/216 |
| 3,732,944 | 5/1973 | Kendall | 180/103 |
| 3,802,737 | 4/1974 | Mertens | 297/216 |
| 3,832,002 | 8/1974 | Eggert, Jr. et al. | 297/216 |
| 3,845,987 | 11/1974 | Bashford | 297/216.1 X |
| 3,998,291 | 12/1976 | Davis | 296/68.1 X |
| 4,154,472 | 5/1979 | Bryll | 296/65 A |
| 4,257,626 | 3/1981 | Adomeit | 280/806 |
| 4,301,983 | 11/1981 | Horan | 244/122 R |
| 4,335,918 | 6/1982 | Cunningham | 297/216 |
| 4,349,167 | 9/1982 | Reilly | 244/122 R |
| 4,363,377 | 12/1982 | Van Gerpen | 180/282 |
| 4,408,738 | 10/1983 | Mazelsky | 244/122 R |
| 4,738,485 | 4/1988 | Rumpf | 297/216 |
| 5,125,472 | 6/1992 | Hara | 180/271 |
| 5,149,165 | 9/1992 | Woolley | 296/68.1 |
| 5,152,578 | 10/1992 | Kiguchi | 297/216 |
| 5,167,421 | 12/1992 | Yunzhao | 297/216 |
| 5,294,175 | 3/1994 | Elton | 297/216.1 |
| 5,340,185 | 8/1994 | Vollmer | 297/284.11 X |
| 5,366,269 | 11/1994 | Beauvais | 297/216.19 |

FOREIGN PATENT DOCUMENTS

| | | | |
|---|---|---|---|
| 358053525 | 3/1983 | Japan | 297/216.1 |
| 9301950 | 2/1993 | WIPO | 297/216.19 |

*Primary Examiner*—Milton Nelson, Jr.
*Attorney, Agent, or Firm*—Kenyon & Kenyon

[57] ABSTRACT

A seat for supporting a passenger in a vehicle includes a seat base having first and second sections. The first and second sections are coupled to the vehicle such that, upon a sudden acceleration of the vehicle, at least a portion of the acceleration being directed from forward to rearward relative to the orientation of the passenger, the first section of the seat base moves away from a rest position and the second section moves away from a rest position along a second predetermined path, so that as the first and second sections move away from their respective rest positions, the distance between a point on the first section and a point on the second section changes and at least a portion of the second section is raised relative to a portion of the first section.

15 Claims, 22 Drawing Sheets

VEHICLE SEAT WITH ARTICULATED SECTIONS

FIELD OF THE INVENTION

The present invention relates generally to vehicle seats and relates more particularly to vehicle seats which move in response to a sudden acceleration of the vehicle.

BACKGROUND OF THE INVENTION

A variety of restraint systems have been devised to improve passenger safety in response to the increasing speed and congestion of vehicular traffic. In order to reduce injuries due to sudden accelerations produced in collisions, the most commonly employed systems have belts or harnesses to fasten about passengers as well as air bags which deploy when sensors determine a collision is beginning. These systems have been fairly effective in controlling passenger motion and absorbing the passengers' kinetic energy.

However, the performance of restraint systems has been put under new constraints due to recent changes in regulations for passenger safety in automobiles and aircraft. These regulations set standards for passenger protection.

For automobiles, the primary change has been a requirement that both upper and lower body safety be achieved by purely "passive" restraint systems. In this context, "passive" refers to the requirement that the passenger not have any active participation in the deployment or application of the restraint system once the passenger is seated in the vehicle. This is currently achieved by using automatically applied seat belts, airbags and knee bolsters. The most common configuration is an airbag to protect the upper torso and head and a knee bolster to provide lower torso restraint.

Thus there is a need for a passive restraint system, particularly one which more effectively controls and restrains a passenger's lower body.

In aircraft, there are new regulations governing the injury levels that passengers may experience in particular instances of sudden accelerations. The use of airbags and shoulder belts to control head excursion in multi-passenger aircraft is impractical.

Additionally, due to advantages in reduced cost and complexity, as well as a greater flexibility in interior layout, it is preferable that an aircraft passenger restraint system not require external power sources or complex sensor control systems.

SUMMARY OF THE INVENTION

The present invention is directed to a seat for supporting a passenger in a vehicle comprising a seat base including a first section and a second section, the first section defining a first point on the first section and the second section defining a second point on the second section, the first and second sections being coupled to the vehicle such that, upon a sudden acceleration of the vehicle, at least a portion of the acceleration being directed from forward to rearward relative to the orientation of the passenger and having a magnitude greater than a predetermined threshold level, the first section of the seat base moves away from a first section rest position so that the first point on the first section moves along a first predetermined path and the second point on the second section moves along a second predetermined path, wherein the first path is different than the second path and wherein as the first and second sections move away from their respective rest positions, the distance between the first and second points changes and at least a portion of the second section is raised relative to a portion of the first section.

DETAILED DESCRIPTION

Figure 1:
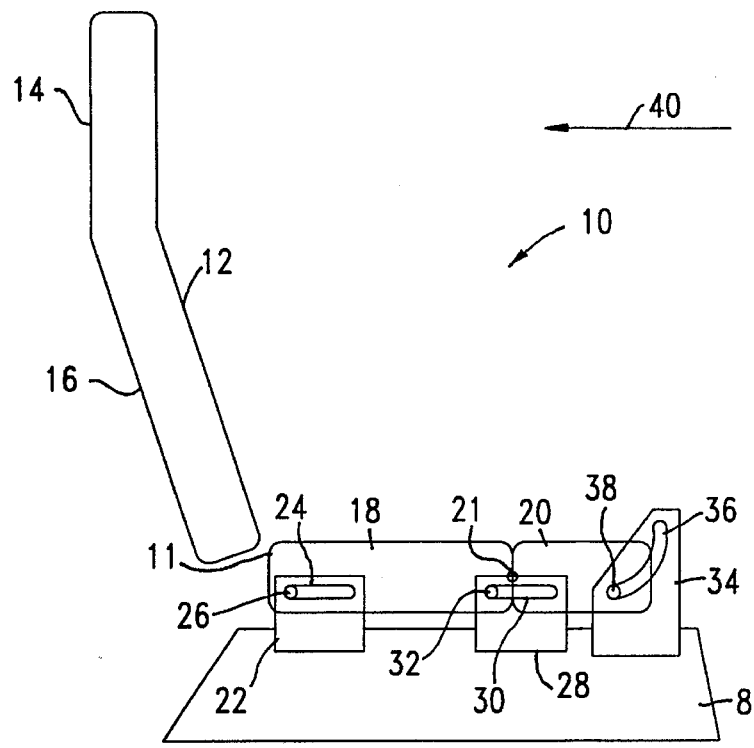
FIG. 1 shows a side view of a vehicle seat including an apparatus according to a first embodiment of the present invention, wherein the vehicle seat is in a rest position.

Referring to FIG. 1, a vehicle seat is indicated generally by the numeral 10 and includes a seat base portion 11 and a seat back portion 12. The seat back portion 12 is rigidly attached to the seat base 11 and consists of an upper portion 14 and a lower portion 16. The seat base 11 consists of a forward portion 20 and a rearward portion 18. A pin 26 is connected to a rearward portion of the seat base portion 18, and a pin 32 is connected to a forward portion of the seat base portion 18. The pins 26 and 32 ride within slots 24 and 30, respectively, formed in plate members 22 and 28 respectively, which are rigidly connected to the vehicle frame. The forward seat base portion 20 is rotatably connected to the seat base portion 18 by a pin 21, and a pin 38, which is connected to a forward portion of the seat base portion 20, rides in an arcuate slot 36 formed in a plate member 34. The plate member 34 is rigidly connected to the vehicle frame. Thus the seat is movably mounted to the plate members 22, 28 and 34 which are rigidly mounted to the plate member 8 which is rigidly mounted to a vehicle frame.

Figure 2:
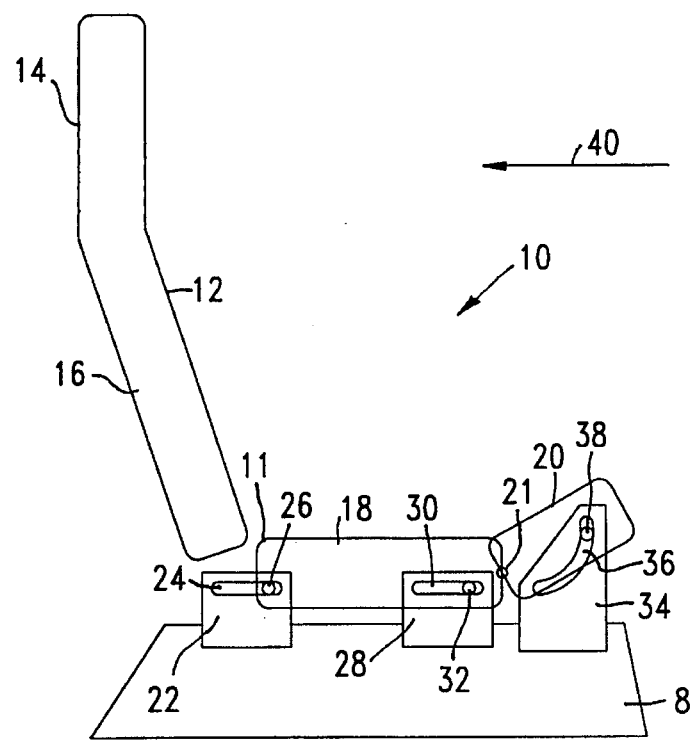
FIG. 2 shows a side view of a vehicle seat including an apparatus according to a first embodiment of the present invention, wherein the vehicle seat is in a second position in response to a sudden acceleration of the vehicle.

In operation, the seat 10 initially occupies a rest position as depicted in FIG. 1, wherein the pins 26, 32 and 38 are located at the rearward ends of the slots 24, 30 and 36, respectively. However, upon a sudden acceleration of the vehicle in the direction of arrow 40, the seat and the passenger exert an inertial force in a direction opposite the arrow 40 against the seat base portion 11 so that the seat 10 is moved in a direction opposite the arrow 40 so that the pins 26 and 32 move forward in slots 24 and 30, respectively, and the pin 38 is moved forward and upward in the slot 36. The seat portion 18 is thus moved forward and the seat base portion 20 is moved forward with its leading edge also moving upward so that the base portion 20 pivots upward about its connection pin 21, as shown in FIG. 2.

Figure 3:
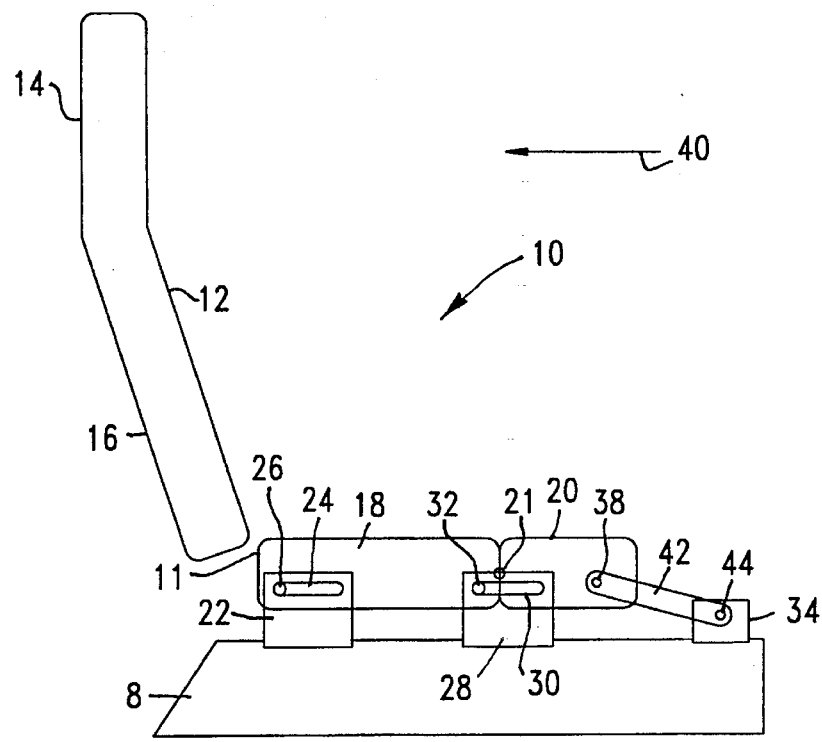
FIG. 3 shows a side view of a vehicle seat including an apparatus according to a second embodiment of the present invention, wherein the vehicle seat is in a rest position.
Figure 4:
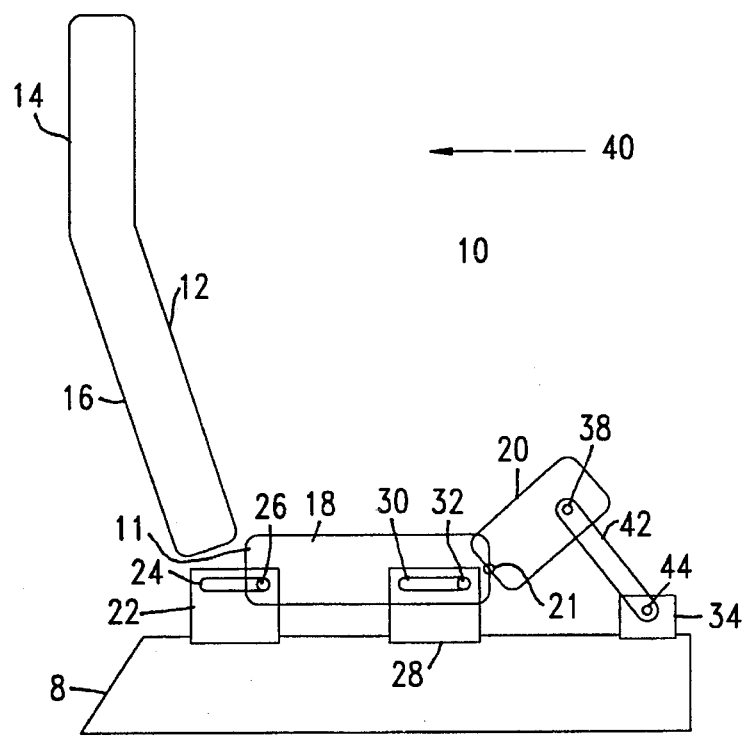
FIG. 4 shows a side view of a vehicle seat including an apparatus according to a second embodiment of the present invention, wherein the vehicle seat is in a second position in response to a sudden acceleration of the vehicle.

A vehicle seat 10 including an apparatus according to a second embodiment of the present invention is shown in FIGS. 3 and 4. A vehicle seat including an apparatus according to the second embodiment of the present invention differs from a seat according to the first embodiment in that the pin 38 is rotatably connected to a bar 42 which is rotatably connected by a pin 44 to the plate member 34.

In operation, the seat 10 according to the second embodiment initially occupies a rest position as depicted in FIG. 3, wherein the pins 26 and 32 are located in the rearward ends of the slots 24 and 30 respectively, and the bar 42 is in a rest position. Upon the sudden acceleration of the vehicle in the direction of the arrow 40, the passenger and the seat exert an inertial force in a direction opposite the arrow 40 against the seat base portion 11 so that the pins 26 and 32 are moved forward in slots 24 and 30, respectively, and the pin 38 moves upward and forward so that the bar 42 rotates clockwise about the pin 44, as seen in FIG. 4.

Therefore, upon the sudden acceleration of the vehicle in the direction of the arrow 40, the forward inertial force of the passenger and seat 10 cause the seat base 11 to be moved forward and simultaneously causes the seat base portion 20 to be rotated counterclockwise about pin 21, as shown in FIG. 4.

Figure 5:
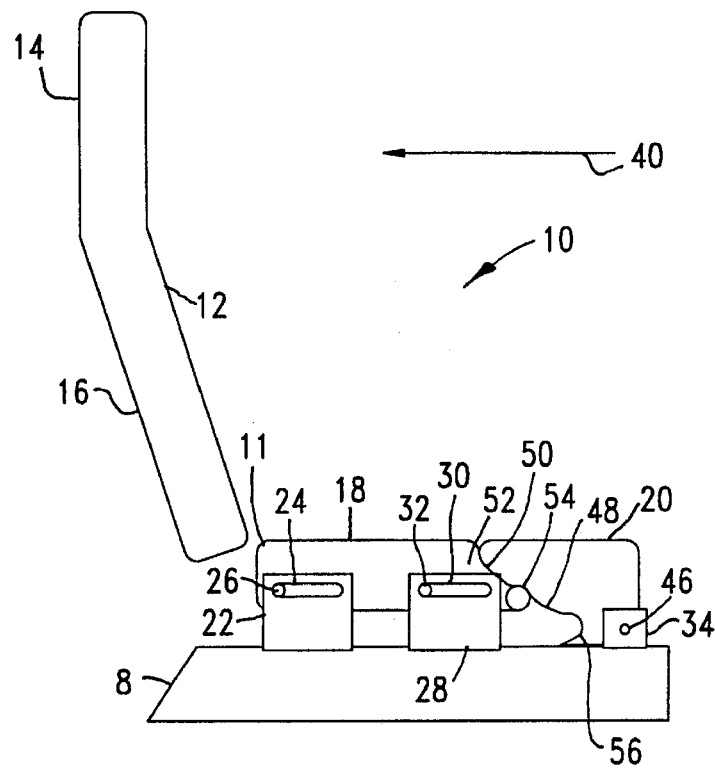
FIG. 5 shows a side view of a vehicle seat including an apparatus according to a third embodiment of the present invention, wherein the vehicle seat is in a rest position.
Figure 6:
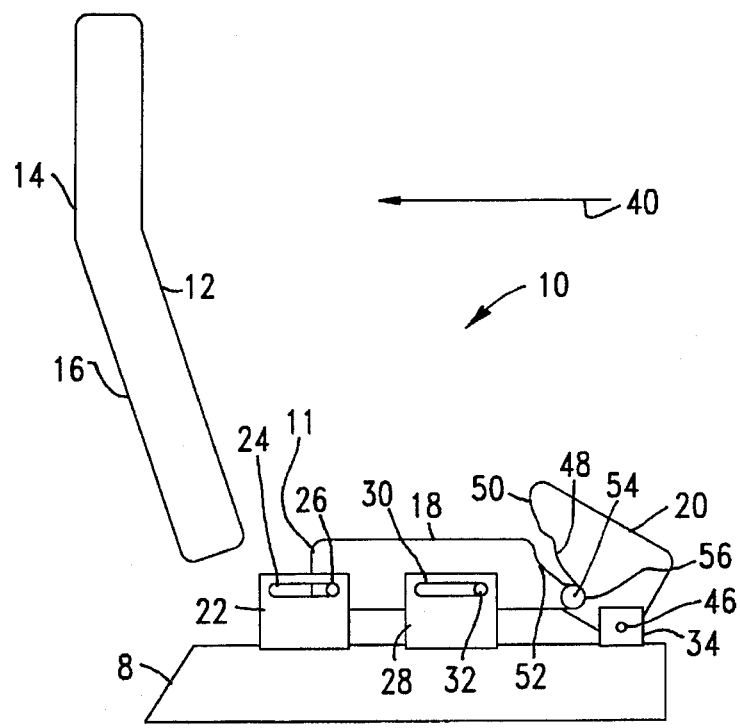
FIG. 6 shows a side view of a vehicle seat including apparatus according to a third embodiment of the present invention, wherein the vehicle seat is in a second position in response to a sudden acceleration of the vehicle.

A vehicle seat 10 including an apparatus according to a third embodiment of the present invention is shown in FIGS. 5 and 6. A vehicle seat according to the third embodiment of the present invention includes a seat base portion 20 which is rotatably connected at its forward edge to the plate member 34 by means of a pin 46. A trailing edge of seat base portion 20 is in sliding contact with a leading edge of the base portion 18. The base portion 18 has an angled surface 52 at its leading edge with a cylinder 54 at the bottom of the surface 52 and the base portion 20 has an upper angled surface 50 at its trailing edge, a lower angled surface 48, and a rounded depression 56 at the bottom.

In operation, the seat 10 initially occupies a rest position, as seen in FIG. 5, wherein the pins 26 and 32 are located at the rearward ends of the slots 24 and 30, respectively. The surface 52 is in contact with the surface 50 and the cylinder 54 lies at the juncture of the surfaces 50 and 48, so that, upon the sudden acceleration of the vehicle in the direction of the arrow 40, the forward inertial force of the passenger and seat 10 cause the seat base portion 11 to be forced forward. Thus, as the base portion 18 is moved forward, with pins 26 and 32 moving forward in slots 24 and 30, respectively, the surface 52 and the cylinder 54 impact on the surfaces 50 and 48, respectively, thereby forcing the base portion 20 to rotate clockwise, as seen in FIG. 6, about the pin 46 until the motion of the seat base portion 18 is arrested when the cylinder 54 is caught in the depression 56.

Therefore, upon the sudden acceleration of the vehicle in the direction of the arrow 40, the forward inertial force of the passenger and seat causes the seat base portion 18 to move along slots 24 and 30, thereby causing the base portion 20 to rotate clockwise so that the surface 50 is raised up under the passenger's thighs.

Figure 7:
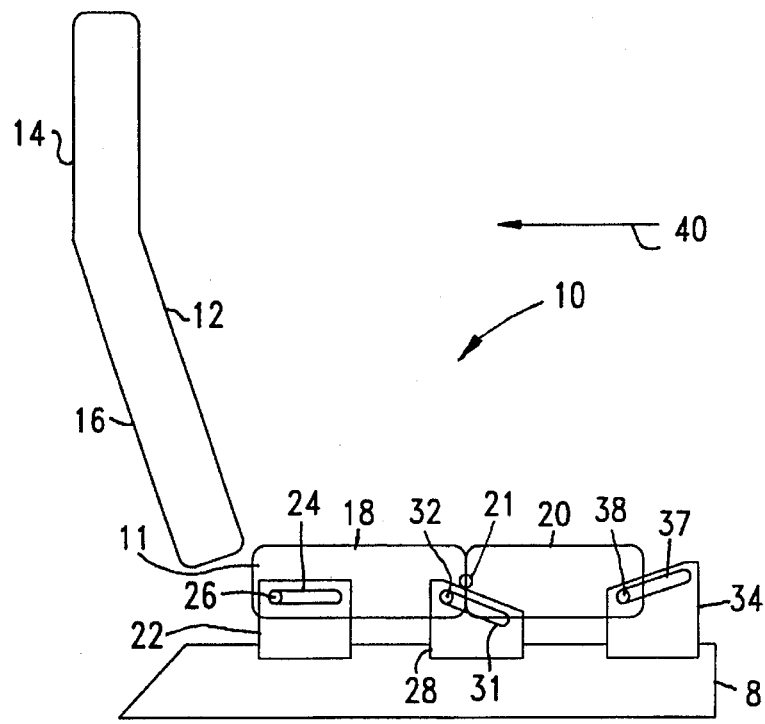
FIG. 7 shows a side view of a vehicle seat including an apparatus according to a fourth embodiment of the present invention, wherein the vehicle seat is in a rest position.
Figure 8:
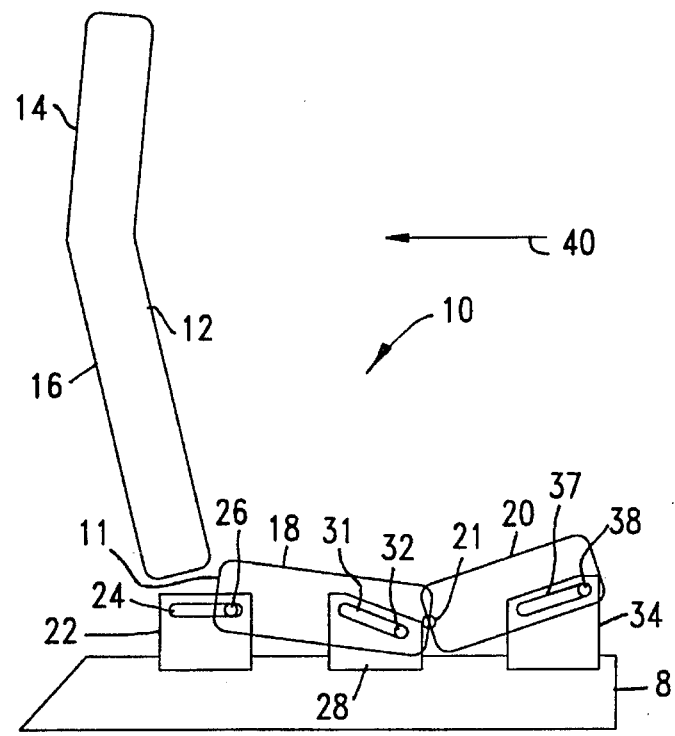
FIG. 8 shows a side view of a vehicle seat including an apparatus according to a fourth embodiment of the present invention, wherein the vehicle seat is in a second position in response to a sudden acceleration of the vehicle.

A vehicle seat 10 including an apparatus according to a fourth embodiment of the present invention is shown in FIGS. 7 and 8. In the fourth embodiment the rear seat base portion 18 is rotatably connected to the forward seat base portion 20 by the pin 21. The pin 26 slides in a horizontal slot 24, while the pin 32 slides in a slot 31 which is at an angle forward and downward from the horizontal and the pin 38 slides in a slot 37 which is inclined at an angle forward and upward from the horizontal.

In operation, the seat 10 initially occupies a rest position, as indicated by FIG. 7, wherein the pins 26, 32, and 38 lie at the rearmost ends of slots 24, 31 and 37, respectively, so that, upon the sudden acceleration of the vehicle in the direction of the arrow 40, the forward inertial force of the passenger and the seat 10 causes the seat base 11 to be moved forward such that, as the base portion 18 is forced forward, the pin 26 slides to the forward end of slot 24 and the pin 32 slides to the lower, forward end of slot 31. Simultaneously, the base portion 20 is forced forward until the pin 38 has slid to the forward, upper end of slot 37, as seen in FIG. 8.

Therefore, upon the sudden acceleration of the vehicle in the direction of the arrow 40, the inertial force of the passenger and seat 10 causes the seat base portion 18 to be moved forward and also downward along slot 31, at its leading edge and the trailing edge of the base portion 20 is moved forward and downward by the pivotable connection, via pin 21, with the base portion 18. This forces the base portion 20 forward as a whole, and also forces the its leading edge upward along the slot 37, thereby causing the base portion 20 to be raised under the thighs of the passenger.

Figure 9:
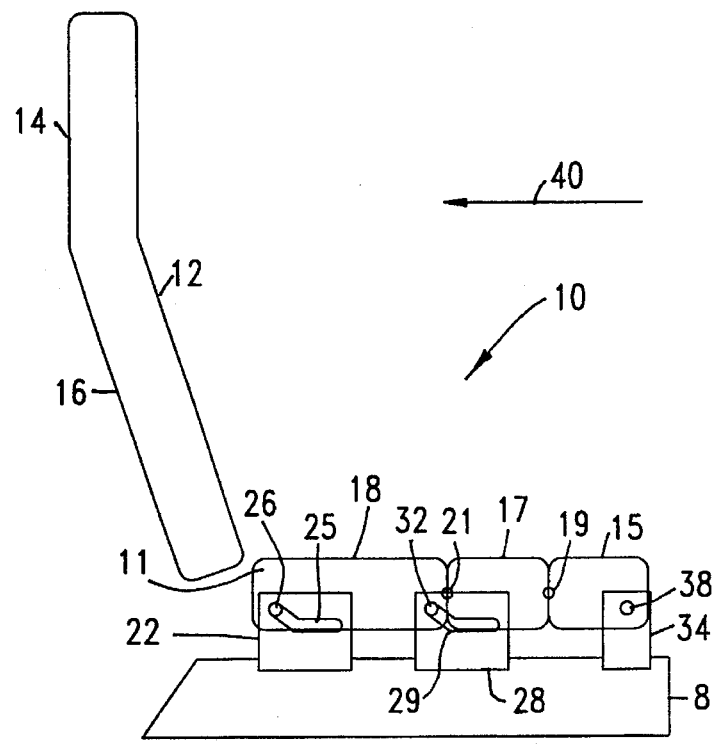
FIG. 9 shows a side view of a vehicle seat including an apparatus according to a fifth embodiment of the present invention, wherein the vehicle seat is in a rest position.
Figure 10:
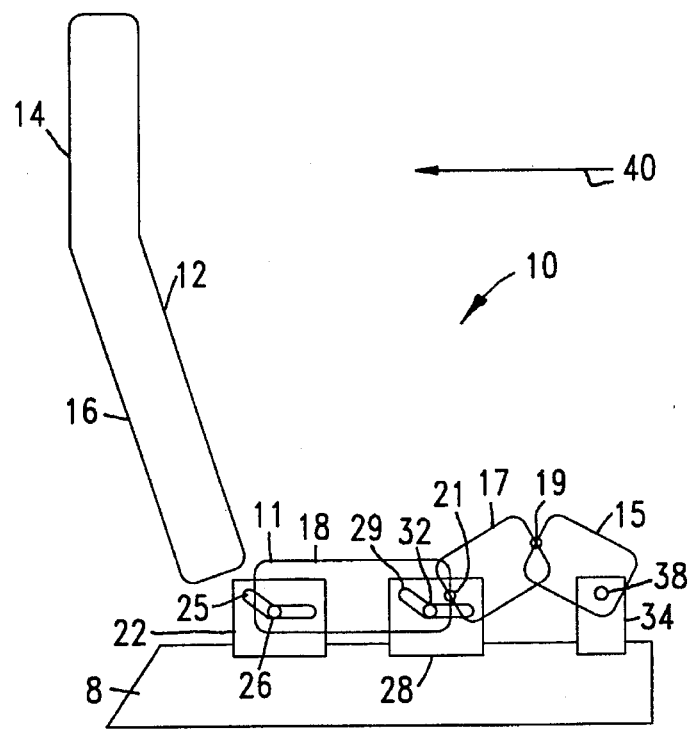
FIG. 10 shows a side view of a vehicle seat including an apparatus according to a fifth embodiment of the present invention, wherein the vehicle seat is in a second position in response to a sudden acceleration of the vehicle.

A vehicle seat 10 including an apparatus according to a fifth embodiment of the present invention is shown in FIGS. 9 and 10. In the fifth embodiment the forward portion 20 of the seat base 11 is divided into two sections, a middle seat base section 17 and a forward seat base section 15, which are rotatably connected by the pin 19. The trailing edge of section 17 is rotatably connected to the base portion 18 by the pin 21. The pins 26 and 32 which support the base portion 18 ride in slots 25 and 29, respectively. Both the slot 25 and the slot 29 have a two fold trajectory with an initial section being oriented forward and downward and a second section extending forward substantially horizontally. The forward portion of the seat base section 15 is rotatably supported by the pin 38 which is coupled to the member 34.

In operation, the seat 10 initially occupies a rest position, as indicated by FIG. 9, wherein the pins 26 and 32 lie at the rearmost ends of the slots 25 and 29, respectively. Upon the sudden acceleration of the vehicle in the direction of the arrow 40, the passenger and the seat 10 exert an inertial force on the seat base 11 in the forward direction so that the seat base portion 18 is forced forward and the pins 26 and 32 move forward and downward along the initial sections of the slots 25 and 29, respectively. During this initial motion, as the base portion 18 and the pin 21 move forward and downward, the rearward edge of section 17 also moves forward and downward. Since the pin 38 restricts the linear forward motion of sections 17 and 15, these seat base sections hinge upward at pin 19. Once the pins 26 and 32 have passed the initial sections of slots 25 and 29, respectively, they subsequently continue forward on the second substantially horizontal sections, causing the pin 21 to travel further forward, thereby increasing the degree of hinging of the seat base sections 17 and 15 about the pin 19, as seen in FIG. 10.

Therefore, upon the sudden acceleration of the vehicle in the direction of the arrow 40, the inertial force of the passenger and seat 10 initially cause the base portion 18 to be moved downward and forward. Thereafter, the seat base portion 18 moves further forward along a substantially horizontal path. This forward motion of the seat base portion 18 induces the simultaneous rotation of the seat base section 17, which moves downward and forward at its trailing edge and upward at its leading edge. Once a significant forward motion of the seat base portion 18 has occurred, the upward hinge point at the pin 19 raises in height and moves forward, thereby raising a barrier up under the passenger's thighs.

Figure 11:
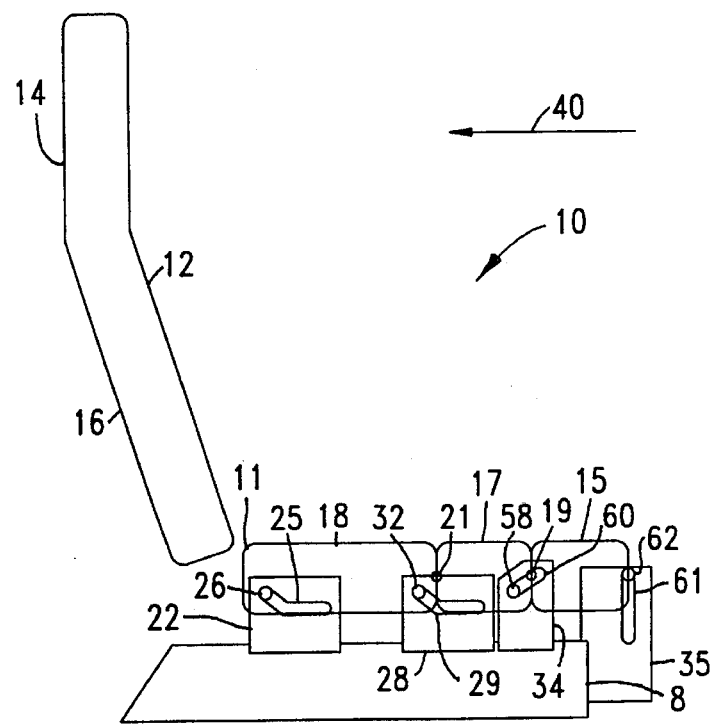
FIG. 11 shows a side view of a vehicle seat including an apparatus according to a sixth embodiment of the present invention, wherein the vehicle seat is in a rest position.
Figure 12:
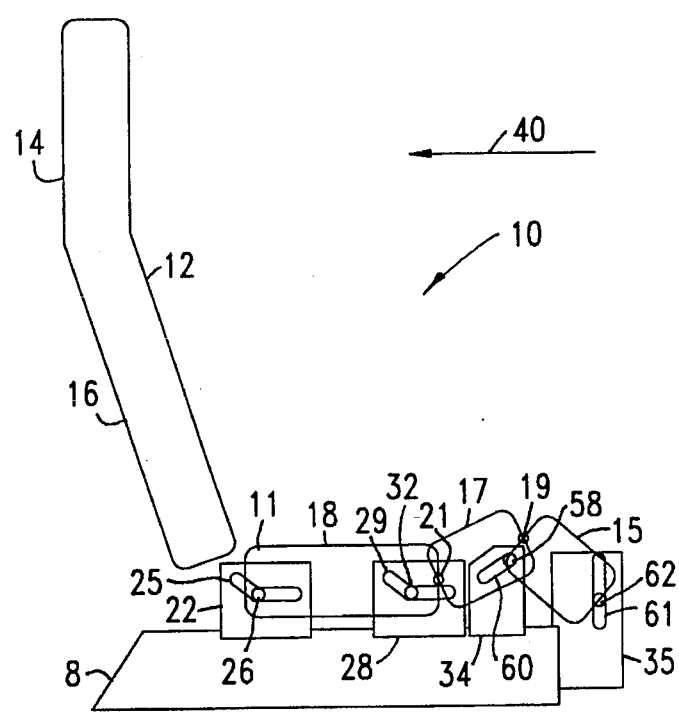
FIG. 12 shows a side view of a vehicle seat including an apparatus according to a sixth embodiment of the present invention, wherein the vehicle seat is in a second position in response to a sudden acceleration of the vehicle.

A vehicle seat 10 including an apparatus according to a sixth embodiment of the present invention is shown in FIGS. 11 and 12. The seat according to the sixth embodiment includes a pin 58 which slides upward and forward along a slot 60 formed in the plate member 34 and may optionally include a pin 62 which slides in a slot 61 formed in a plate member 35.

In operation, the seat 10 initially occupies a rest position as indicated by FIG. 11, wherein the pins 26, 32 and 58 lie at the rearmost ends of slots 25, 29 and 60, respectively, and the pin 62 lies at the upper end of the slot 61. Upon the sudden acceleration of the vehicle in the direction of the arrow 40, the passenger and the seat 10 exert an inertial force on the base 11 in the forward direction. The base portion 18 is then urged forward as described in regard to the fifth embodiment, causing the base section 17 to move forward and to rotate counterclockwise as shown in FIGS. 11 and 12. The motion of the leading portion of the base section 17 is directed by the movement of the pin 58 forward and upward along the slot 60. As the section 17 moves forward and rotates, the trailing edge of the section 15 is lifted upward and moved forward by the pin 19, causing the section 15 to rotate clockwise, as seen in FIG. 12, and thus forcing the pin 62 to slide down the slot 61, as shown in FIG. 12.

Therefore, upon the sudden acceleration of the vehicle in the direction of the arrow 40, the inertial force of the passenger and the seat 10 cause the base portion 18 to be moved forward and downward, the base section 17 to be moved downward at its trailing edge and upward at its leading edge, as well as causing base section 15 to be moved upward at its trailing edge and downward at its forward edge. Thus a barrier is raised up under the passenger's thighs.

Figure 13:
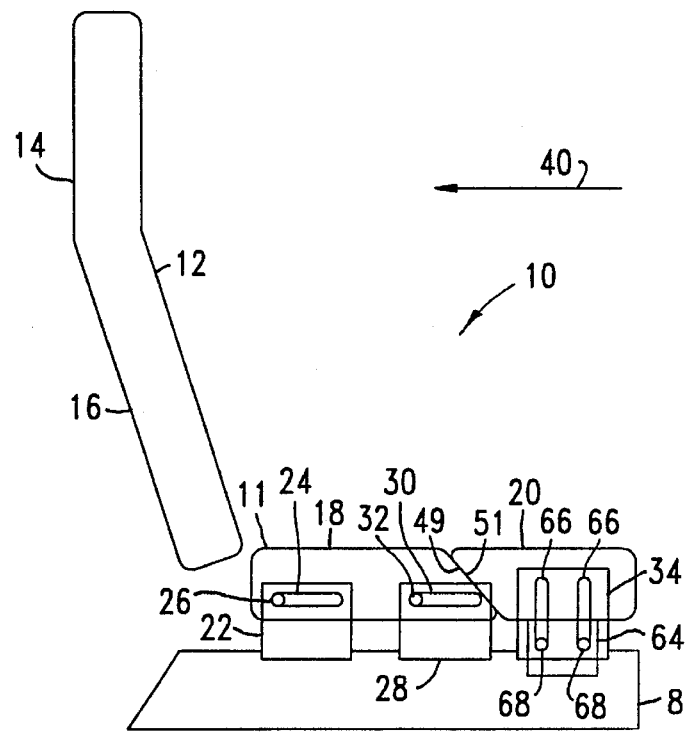
FIG. 13 shows a side view of a vehicle seat including an apparatus according to a seventh embodiment of the present invention, wherein the vehicle seat is in a rest position.
Figure 14:
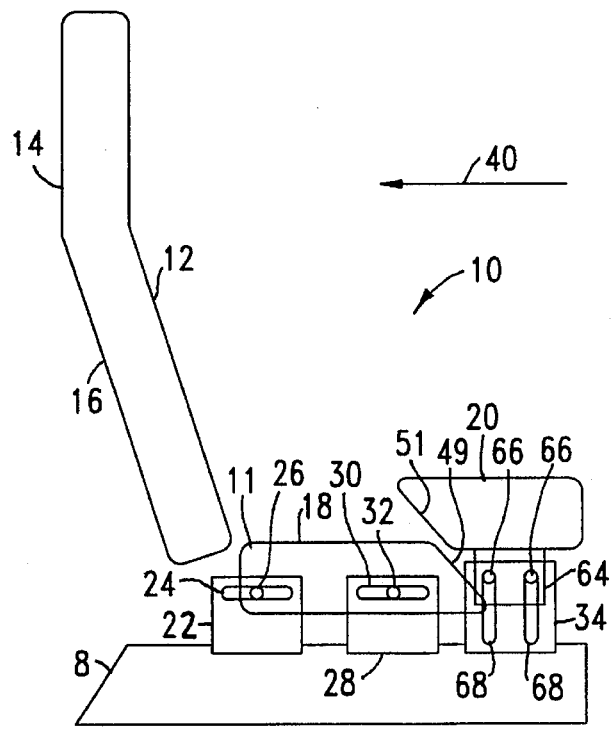
FIG. 14 shows a side view of a vehicle seat including an apparatus according to a seventh embodiment of the present invention, wherein the vehicle seat is in a second position in response to a sudden acceleration of the vehicle.

A vehicle seat 10 including an apparatus according to a seventh embodiment of the present invention is shown in FIGS. 13 and 14. A seat 10 according to the seventh embodiment of the present invention includes a seat base portion 18 having a diagonal forward edge 49 which slopes forward from the upper surface of the seat base portion 18 to the lower surface of the seat base portion 18. The seat base portion 20 has a complimentary diagonal rearward edge 51 which, when the seat 10 is in the rest position as shown in FIG. 13, is in contact with the edge 49. The base portion 20 is supported by a plate member 64 which is coupled to the pins 68. The pins 68 are slidably received in slots 66 which are formed in plate member 34 which is mounted on the plate member 8.

In operation, the seat 10 initially occupies a rest position as indicated in FIG. 13, wherein the pins 26 and 32 lie at the rearmost ends of slots 24 and 30, respectively, and wherein the pins 68 lie at the bottom of the slots 66. Upon the sudden acceleration of the vehicle in the direction of the arrow 40, the passenger and the seat 10 exert an inertial force on the seat base portion 18 in the forward direction. Thus, the seat base portion 18 is moved forward along the slots 24 and 30 and the forward edge 49 of the seat base portion 18 is moved forward relative to the rearward edge 51 of the seat base portion 20. This causes the seat base portion 20 to move upward so that the pins 66 move upward along the slots 68, as shown in FIG. 14.

Therefore, upon the sudden acceleration of the vehicle in the direction of the arrow 40, the seat base portion 18 moves forward forcing the seat base portion 20 upward as a barrier under the passenger's thighs.

Figure 15:
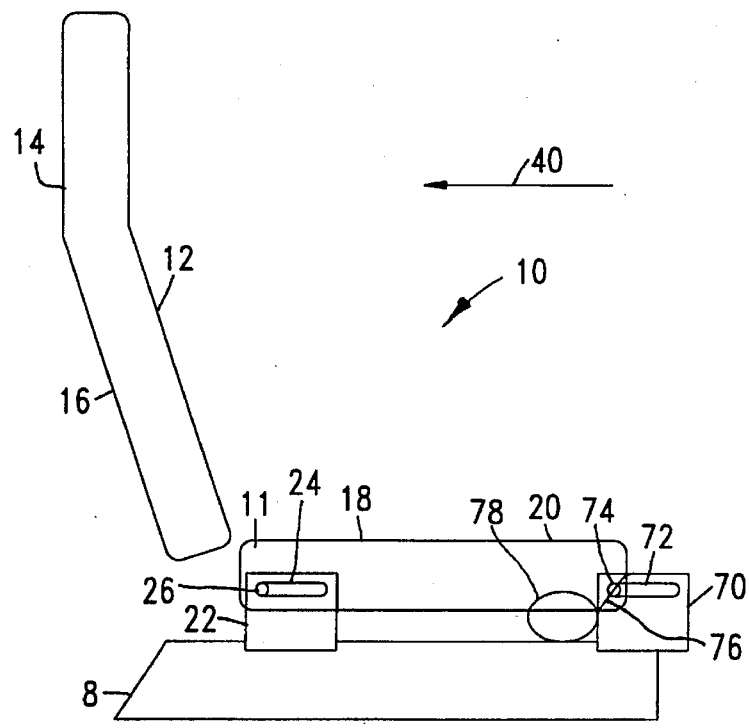
FIG. 15 shows a side view of a vehicle seat including an apparatus according to an eighth embodiment of the present invention, wherein the vehicle seat is in a rest position.
Figure 16:
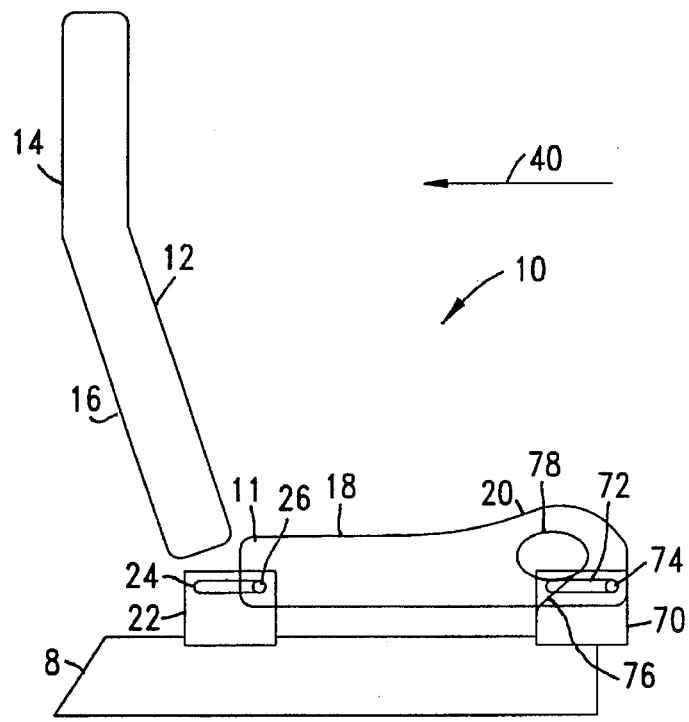
FIG. 16 shows a side view of a vehicle seat including an apparatus according to an eighth embodiment of the present invention, wherein the vehicle seat is in a second position in response to a sudden acceleration of the vehicle.

A vehicle seat 10 including an apparatus according to an eighth embodiment of the present invention is shown in FIGS. 15 and 16. In a seat 10 according to the eighth embodiment, the seat base 11 is supported by pins 26 and 74 which ride in slots 24 and 72, respectively. The slot 72 is formed in a plate member 70 which is coupled to the support member 8. In addition, an oval projection 78, which is coupled to the seat base portion 18 so that it may move vertically relative to the seat base portion 18, initially lies at the rearward edge of a ramp plate member 76 which is coupled to the plate member 70.

In operation, the seat initially occupies a rest position as indicated by FIG. 15, wherein the pins 26 and 74 lie at the rearmost ends of slots 24 and 72, respectively, and the projection 78 is located to the rear of the ramp 76. Upon the sudden acceleration of the vehicle in the direction of the arrow 40, the passenger and the seat 10 exert an inertial force on the base 11 in the forward direction. Thus, the base 11 is moved forward so that the pins 26 and 74 move forward along the slots 24 and 72, respectively. This forward motion causes the projection 78 to move forward and upward along the ramp 76 so that the upper surface of the seat base portion 20 is moved upward relative to its initial position, as shown in FIG. 16.

Therefore, upon the sudden acceleration of the vehicle in the direction of the arrow 40, the seat base 11 is forced forward causing the projection 78 to be raised under the seat base portion which causes the upper surface of the seat base portion 20 to be raised as a barrier under the passenger's thighs.

Figure 17:
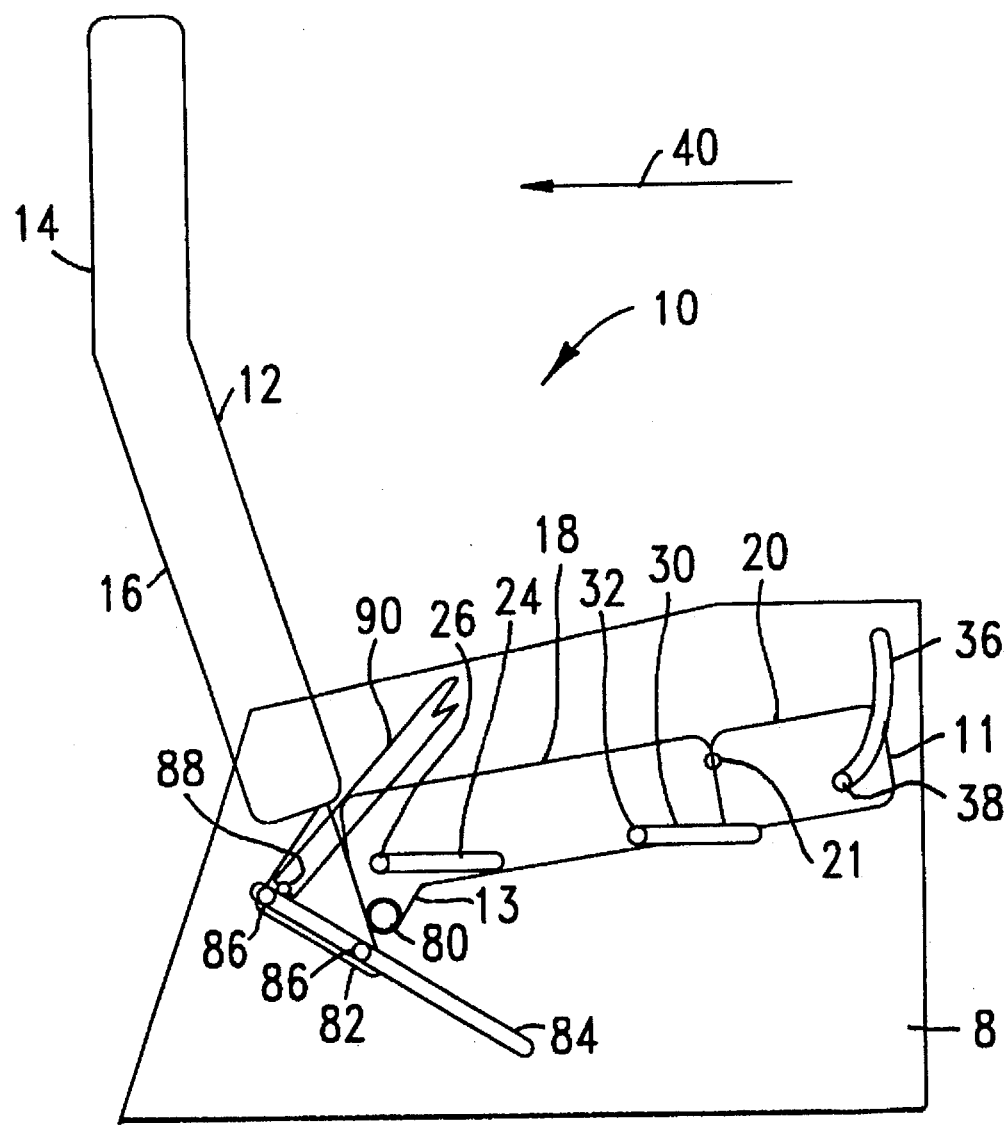
FIG. 17 shows a side view of a vehicle seat including an apparatus according to a ninth embodiment of the present invention, wherein the vehicle seat is in a rest position.
Figure 18:
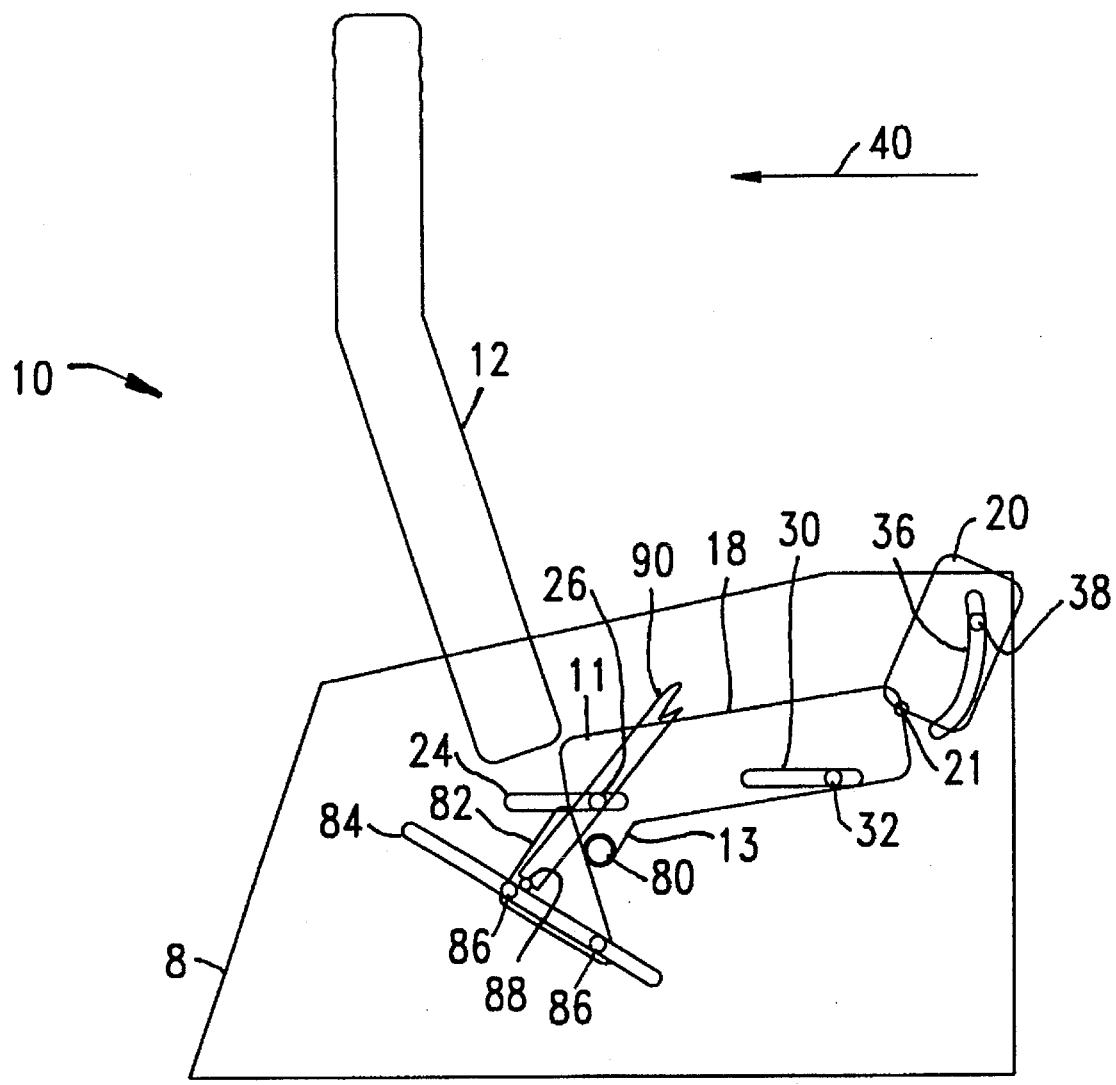
FIG. 18 shows a side view of a vehicle seat including an apparatus according to a ninth embodiment of the present invention, wherein the vehicle seat is in a second position in response to a sudden acceleration of the vehicle.

A vehicle seat 10 including an apparatus according to a ninth embodiment of the present invention is shown in FIGS. 17 and 18. In a seat 10 according to the ninth embodiment the seat base 11 construction is similar to that of the seat according to the first embodiment except that the seat base 11 as a whole is shown initially inclined slightly above the horizontal, from front to back. However, the slots 24 and 30 are still essentially horizontal, and the slots 24, 30 and 36, which may optionally be all formed from the plate support member 8, also being at different heights relative to the vehicle frame. The pivotable connection pin 21 which is coupled between the seat base portions 18 and 20 may be located at a higher point on the juncture between those base portions. In addition, the seat 10 includes a restraining member 90 which is coupleable about a passenger and which is adjustable to a desired length, either manually or automatically, by means of mechanisms well known in the art. The restraining member 90 is coupled to a sliding member 82 by means of a pin 88. The sliding member 82 is coupled to pins 86 which ride in a slot 84 which is formed in the plate support member 8. A rod 80 which is coupled to a projection 13 of the seat base portion 18, abuts the forward edge of the sliding member 82. Those skilled in the art will recognize that a seat according to this embodiment of the present invention may also include known means for imparting a known resistance to the movement of sliding member 82 which may be constant or which may vary as a function of the speed at which the member 82 moves, or the distance which the member 82 moves from the rest position. This allows the design of a system which will provide a desired belt tightening and a desired seat motion for a given acceleration.

In operation, the seat 10 initially occupies a rest position wherein the pins 86, 26, 32 and 38 are located at the rearmost ends of the slots 84, 24, 30 and 36, respectively, as shown in FIG. 17. Upon the sudden acceleration of the vehicle in the direction of the arrow 40, the passenger and the seat 10 exert an inertial force on the seat base 11 in the forward direction. The passenger's forward inertial force impacts upon the restraining member 90 which translates the force to the sliding member 82 via the pin 88. Thus, the sliding member 82 is moved forward against the rod 80, thereby transmitting the passenger's inertial force to the rod 80 and thus to the seat base 11. This, in addition to the forward inertial force of the seat 10, causes the seat base 11 to move forward and causes the pins 26 and 32 to move forward along the slots 24 and 30, respectively. In addition, the pin 38 is moved forward and upward along the slot 36 as shown in FIG. 18.

Therefore, upon the sudden acceleration of the vehicle in the direction of the arrow 40, the seat base portion 18 is forced forward while the seat base portion 20 is forced upward under the passenger's thighs, pivoting upward at pin 21. In addition, the restraining member 90 is simultaneously tightened about the passenger and contributes to the motion of the seat 10.

Figure 19:
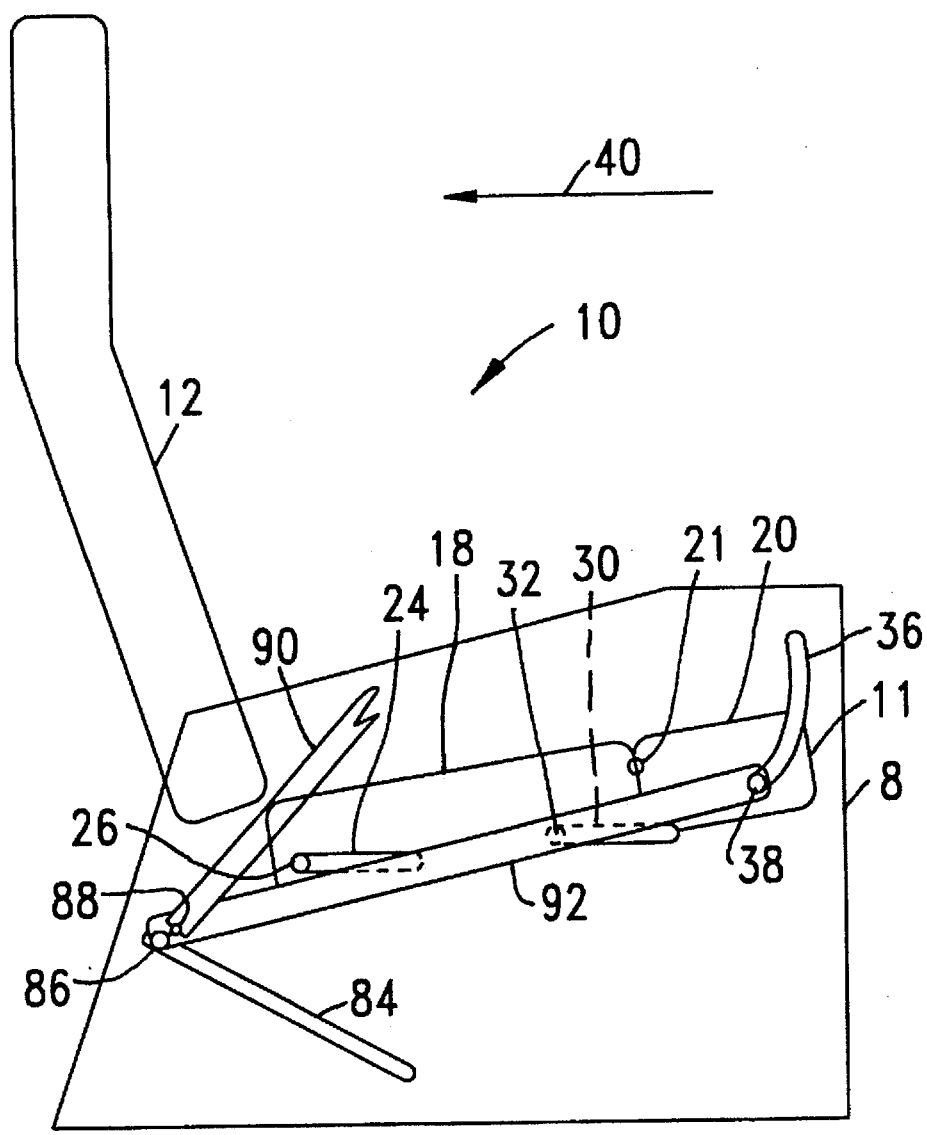
FIG. 19 shows a side view of a vehicle seat including an apparatus according to a tenth embodiment of the present invention, wherein the vehicle seat is in a rest position.
Figure 20:
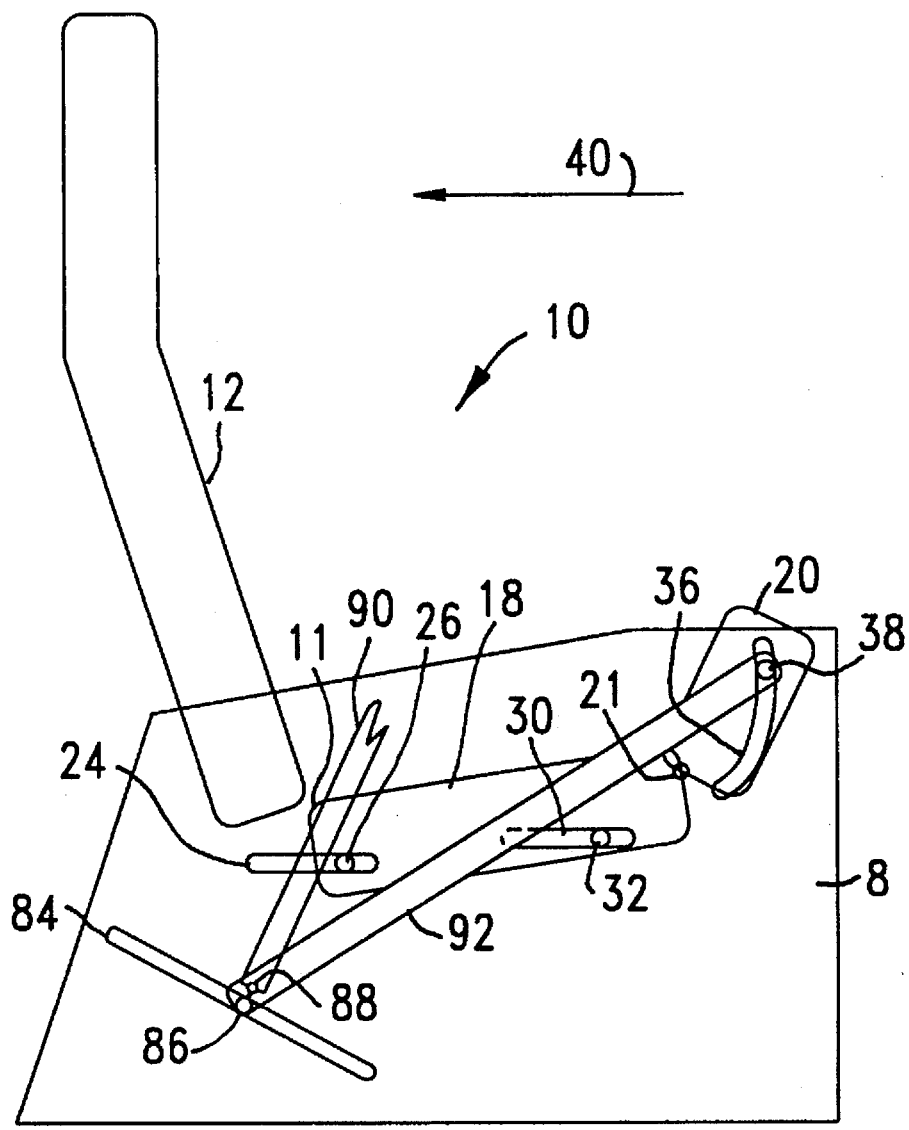
FIG. 20 shows a side view of a vehicle seat including an apparatus according to a tenth embodiment of the present invention, wherein the vehicle seat is in a second position in response to a sudden acceleration of the vehicle.

A vehicle seat 10 including an apparatus according to a tenth embodiment of the present invention is shown in FIGS. 19 and 20. The construction of the seat according to the tenth embodiment is similar to that of the ninth embodiment except that, in this embodiment, the pins 86 and 88 are rotatably connected to the rearward end of a bar 92. The forward end of the bar 92 is rotatably connected to the pin 38. Also, the rod 80 and projection 13 are not included in this embodiment.

In operation, the seat 10 initially occupies a rest position as shown in FIG. 19 wherein the pins 86, 26, 32 and 38 are located at the rearmost ends of the slots 84, 24, 30 and 36, respectively. Upon the acceleration of the vehicle in the direction of the arrow 40, the passenger and the seat 10 exert an inertial force on the base 11 in the forward direction. The passenger's inertial force impacts upon the restraining member 90 which translates the force to the bar 92 via the pin 88. As the bar 92 is pulled forward it is simultaneously directed downward at its rearward end by the movement of pin 86 along the slot 84. In moving forward, the bar 92, via pin 38, pushes the forward area of the seat base portion 20 so that the pin 38 moves forward and upward in the slot 36 as the rearward end of the seat base portion 20 is moved forward via the pin 21, as shown in FIG. 20.

Therefore, upon the sudden acceleration of the vehicle in the direction of the arrow 40, the seat base portion 18 is forced forward, the restraining member 90 is tightened about the passenger as the pin 88 moves further along the slot 84 and the seat base portion 20 is moved forward and a leading portion of the seat base 20 is moved upward under the passenger's thighs.

Figure 21:
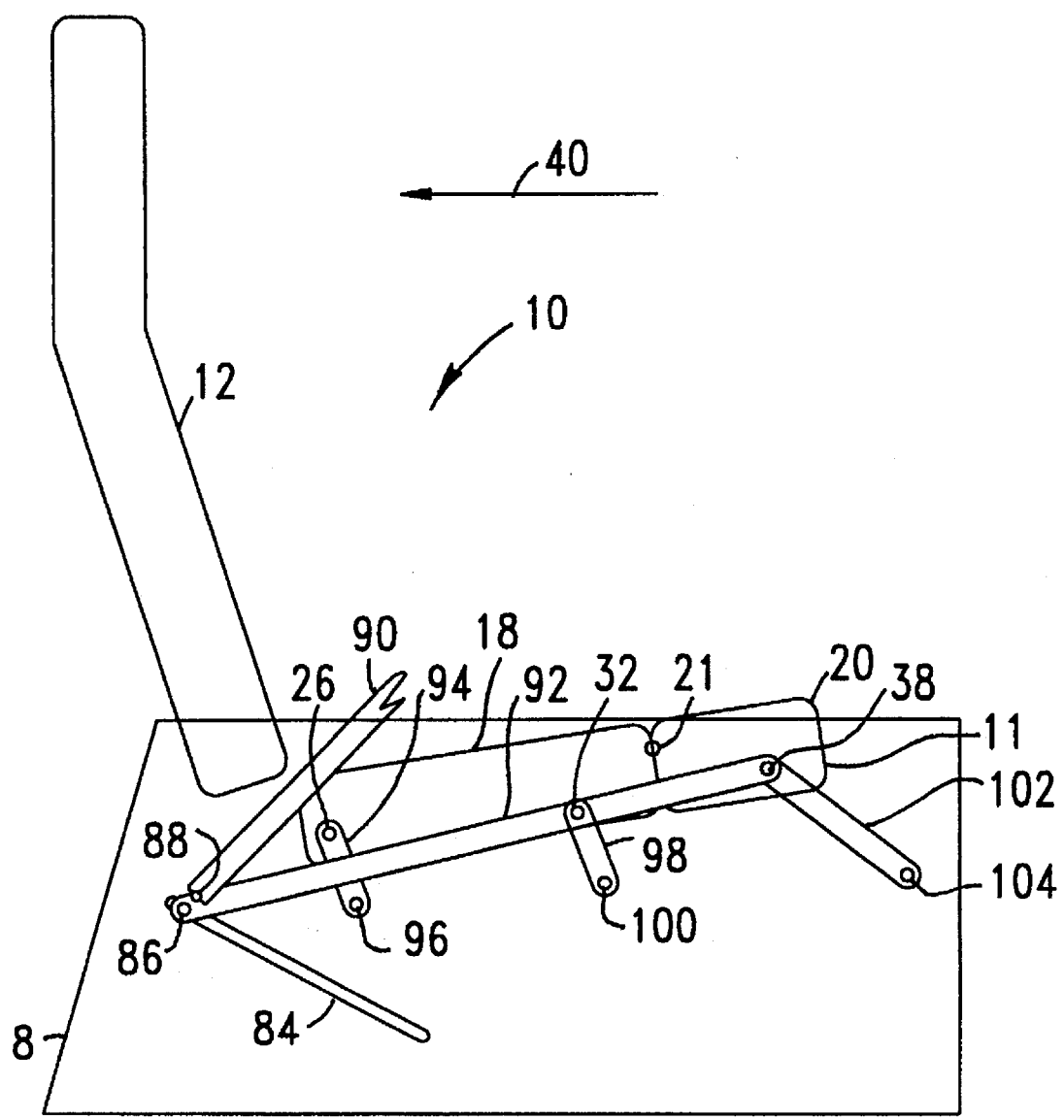
FIG. 21 shows a side view of a vehicle seat including an apparatus according to an eleventh embodiment of the present invention, wherein the vehicle seat is in a rest position.
Figure 22:
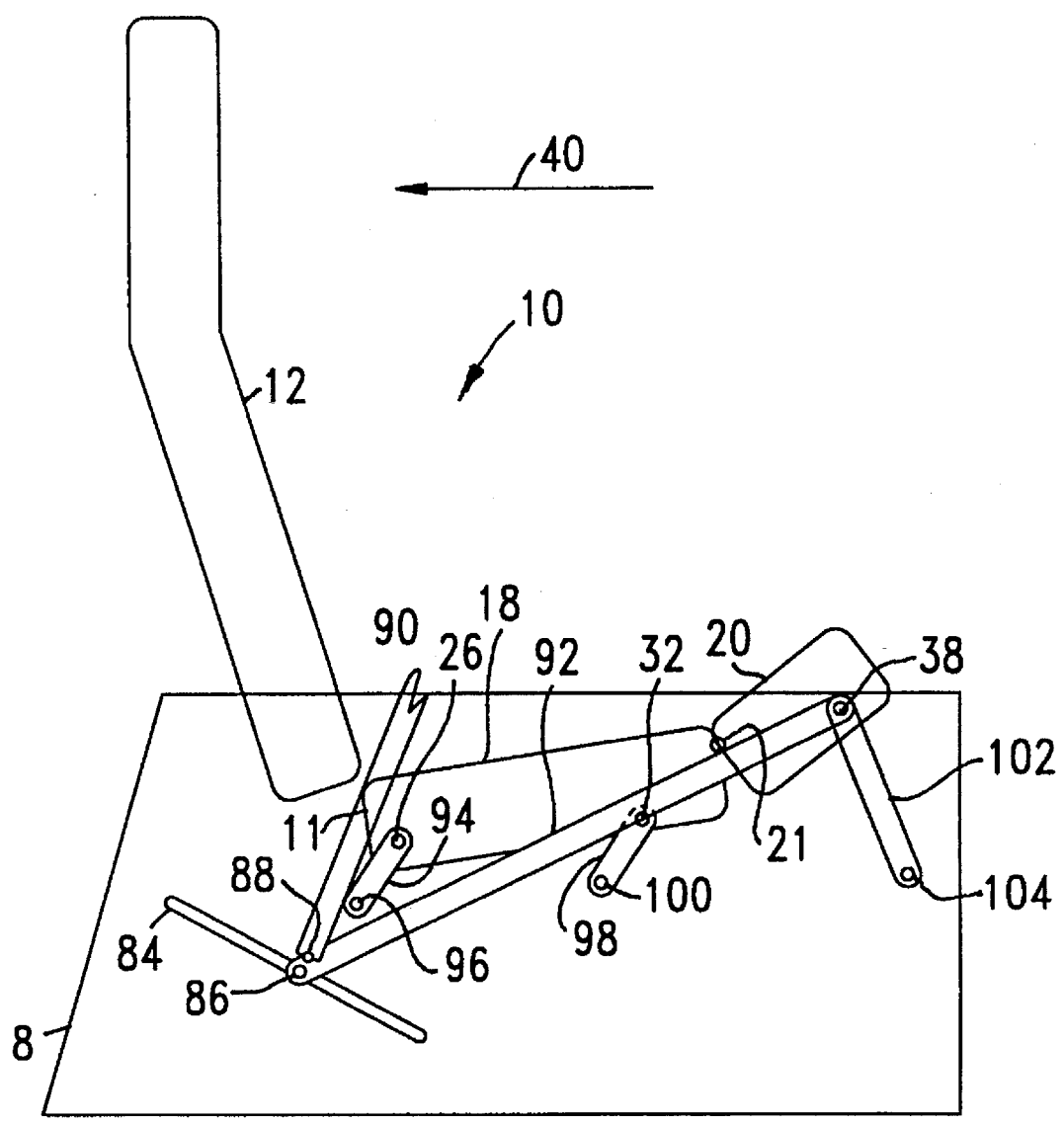
FIG. 22 shows a side view of a vehicle seat including an apparatus according to an eleventh embodiment of the present invention, wherein the vehicle seat is in a second position in response to a sudden acceleration of the vehicle.

A vehicle seat 10 including an apparatus according to an eleventh embodiment of the current invention is shown in FIGS. 21 and 22. In the eleventh embodiment the seat base portion 18 is supported at its rear by a pin 26 which is rotatably connected to the upper end of a bar 94. The lower end of the bar 94 is rotatably connected to the plate support member 8 via a pin 96. A bar 98 is rotatably connected at its lower end to the plate support member 8 via a pin 100 and is rotatably connected at its upper end to the forward portion of the seat base portion 18 by the pin 32. A bar 102 is rotatably connected at its lower end to the plate support member 8 by a pin 104, and is rotatably connected at its upper end to the forward area of the seat base portion 20 by the support pin 38. As in the tenth embodiment, the restraining member 90 is rotatably connected to the rearward end of the bar 92 by the pin 88, and is rotatably connected to the pin 38 at its forward end.

In operation, the seat 10 initially occupies a rest position as indicated by FIG. 21, wherein the pin 86 is located at the rearmost end of the slot 84, and the bars 94, 98 and 102 are located at their rearmost positions. Upon the sudden acceleration of the vehicle in the direction of the arrow 40, the passenger and the seat 10 exert an inertial force on the seat base 11 and the restraining member 90. The passenger's inertial force impacting upon the restraining member 90 is translated to the pin 38 via the bar 92 so that the movement of the forward end of the bar 92 is controlled by the arc of motion of the bar 102. The arc of motion of the bar 102 also controls the motion of the forward area of the seat base portion 20. The seat base portion 18 moves through a trajectory defined by the pivoting of the bars 94 and 98, which also controls the motion of the rear of the seat base portion 20 via the pivotable juncture at the pin 21.

Therefore, upon the sudden acceleration of the vehicle in the direction of the arrow 40, the seat base portion 18 is forced forward and the restraining member 90 is tightened about the passenger, translating the passenger's inertial force to the seat base portion 20 via the bar 92. This accelerates the motion of the seat base portion 20 forward while simultaneously moving the forward portion of the seat base portion 20 forward and upward under the passenger's thighs.

Figure 23:
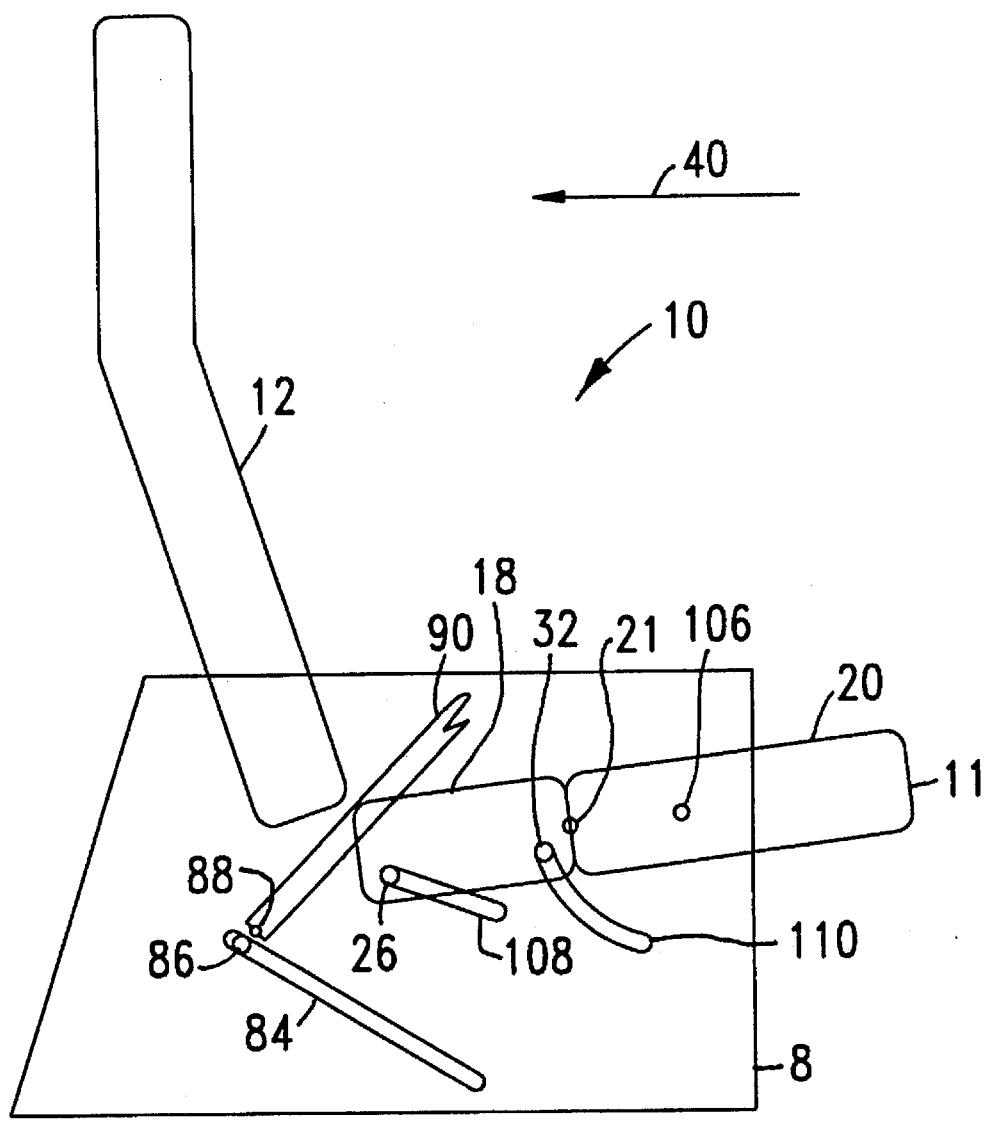
FIG. 23 shows a side view of a vehicle seat including an apparatus according to a twelfth embodiment of the present invention, wherein the vehicle seat is in a rest position.
Figure 24:
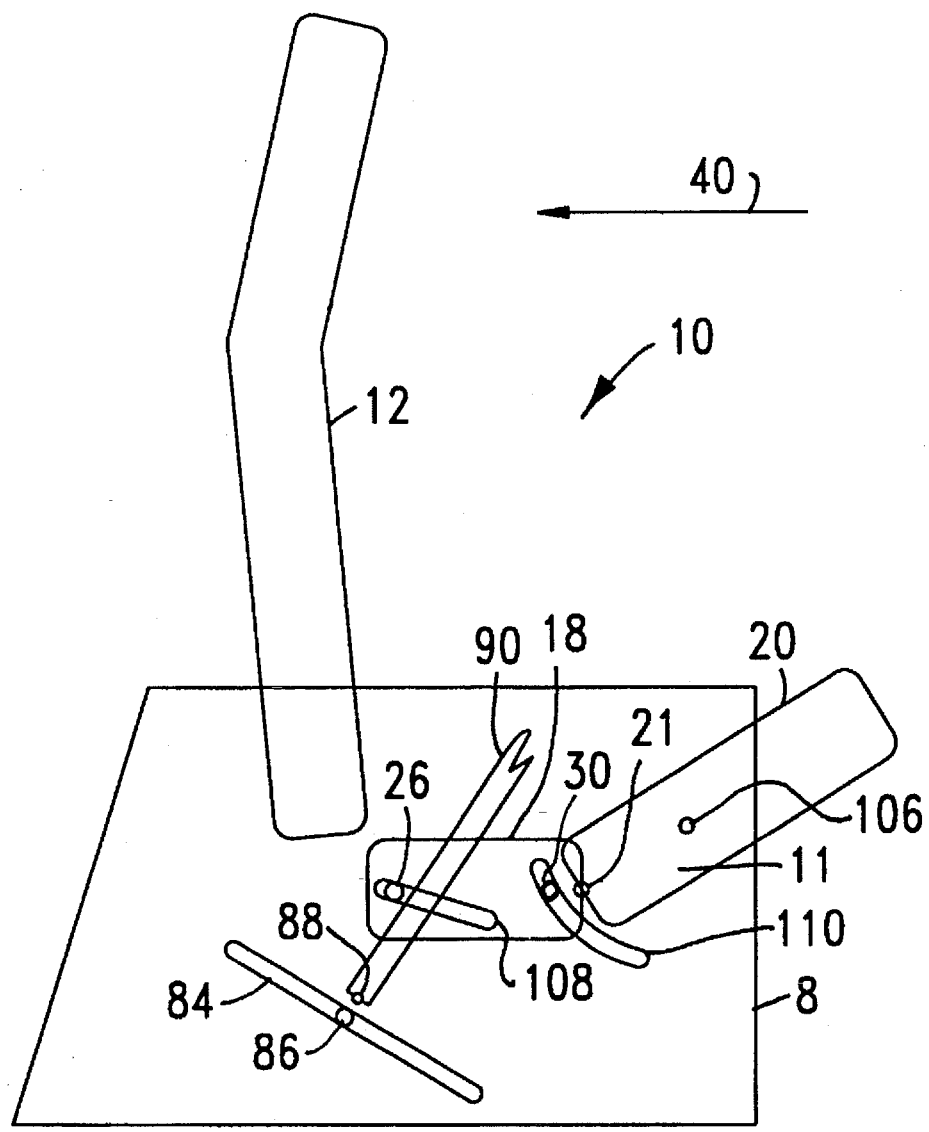
FIG. 24 shows a side view of a vehicle seat including an apparatus according to a twelfth embodiment of the present invention, wherein the vehicle seat is in a second position in response to a sudden acceleration of the vehicle.

A vehicle seat 10 including an apparatus according to a twelfth embodiment of the current invention is shown in FIGS. 23 and 24. In a seat according to the twelfth embodiment the pin 26, which supports the rear of the seat base portion 18, slides in a linear slot 108 which is formed in the plate support member 8 and which slopes downward from its rearward to its forward end. The pin 32, which supports the front of the seat base portion 18, rides in an arcuate slot 110 which is formed in the plate support member 8 and which slopes downward from rear to front in a concave upward curve. The seat base portion 20 is rotatably coupled to the seat base portion 18 by the pin 21 and is rotatably coupled to the plate support member 8 by a pin 106. In addition, while the restraining member 90 is connected to the pin 86, which is slidably received in the slot 84, there is no direct connection between the seat base 11 and the pin 86. Therefore, there is no direct connection between the restraining member 90 and the seat 10.

In operation, the seat 10 initially occupies a rest position as indicated by FIG. 23, wherein the pins 26, 32 and 86 lie at the upper, rearward ends of the slots 108, 110 and 84, respectively. Upon the sudden acceleration of the vehicle in the direction of the arrow 40, the passenger and seat 10 exert an inertial force on the base 11 and the restraining member 90. The passenger's inertial force on the seat base 11 causes the seat base portion 18 to move forward and downward along the slots 108 and 110, so that the seat base portion rotates clockwise, as seen in FIG. 23. As a consequence, the seat base portion 20, through the connection pin 21, rotates counterclockwise about pin 106, as seen in FIG. 24. Simultaneously, the passenger's inertial force, impacting upon the restraining member 90, pulls the pin 86 along the slot 84, as shown in FIG. 24.

Therefore, upon the sudden acceleration of the vehicle in the direction of the arrow 40, the seat base portion 18 is forced downward and forward so that the pins 26 and 86 move along the slots 108 and 110, respectively, thus causing the base portion 20 to rotate about the pin 106 so that its forward edge is raised under the passenger's thighs. Simultaneously, the downward and forward motion of the restraining member 90 in the slot 84 restrains the passenger by its movement.

Figure 25:
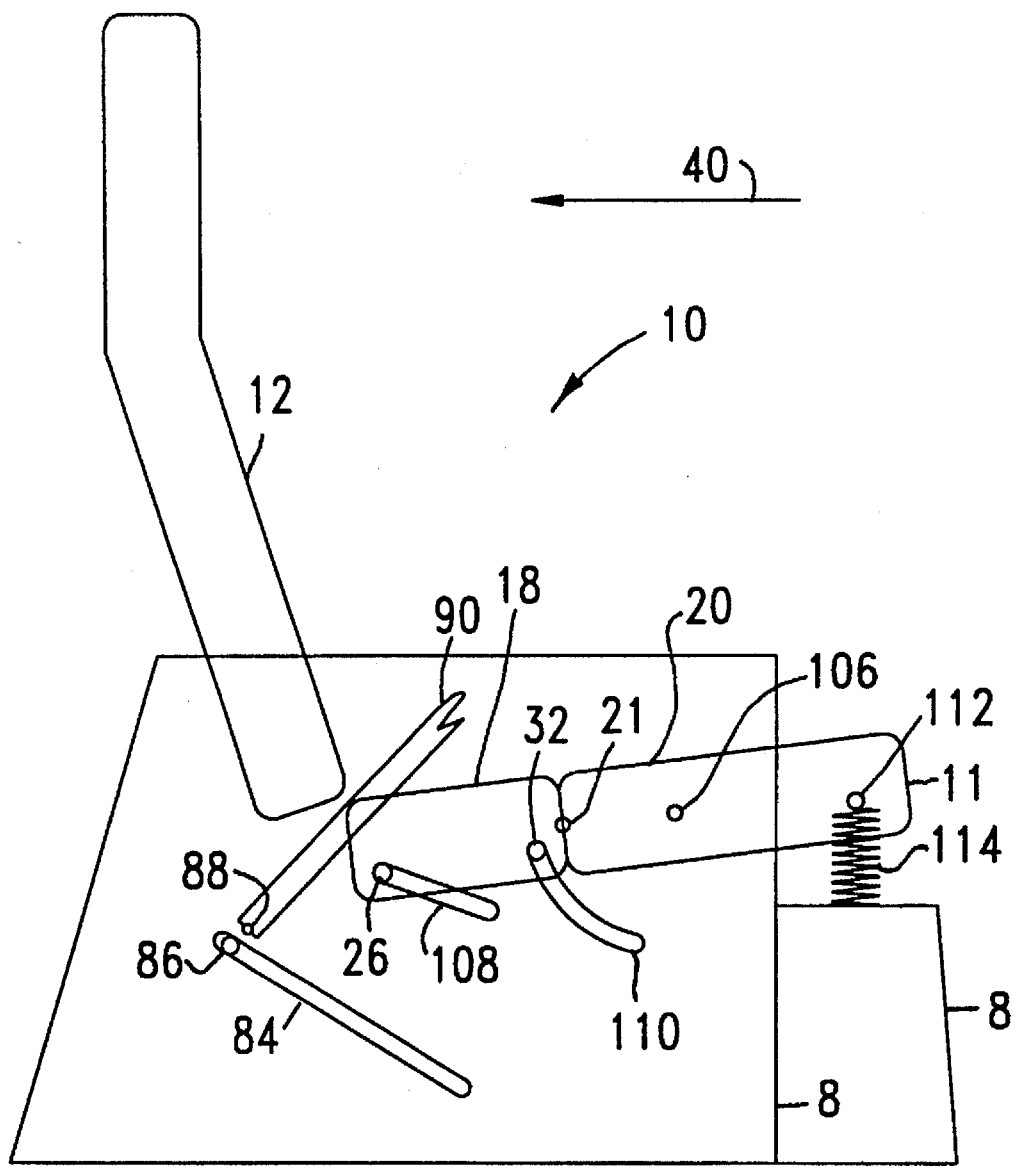
FIG. 25 shows a side view of a vehicle seat including an apparatus according to a thirteenth embodiment of the present invention, wherein the vehicle seat is in a rest position.
Figure 26:
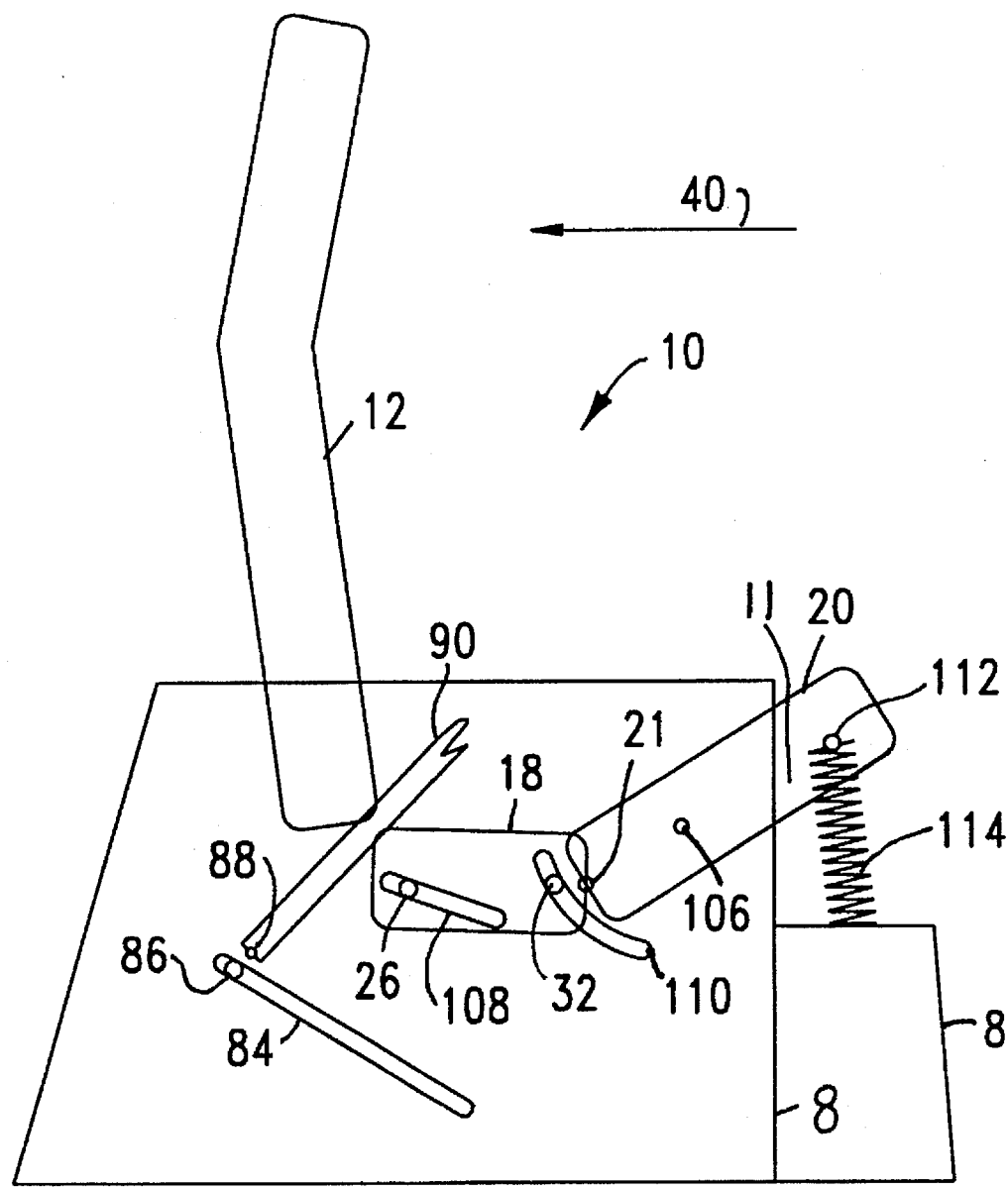
FIG. 26 shows a side view of a vehicle seat including an apparatus according to the thirteenth embodiment of the present invention, wherein the vehicle seat is in a second position in response to a sudden acceleration of the vehicle.

A vehicle seat 10 including an apparatus according to a thirteenth embodiment of the present invention is shown in FIGS. 25 and 26. The thirteenth embodiment is identical to the twelfth in construction and action except that a pre-compressed spring 114 is mounted on the plate support member 8 and is attached to a pin 112 which is mounted on the forward section of the seat base portion 20. In action, the spring 114 serves only to increase the rapidity of motion of the seat base portion 20.

Figure 27:
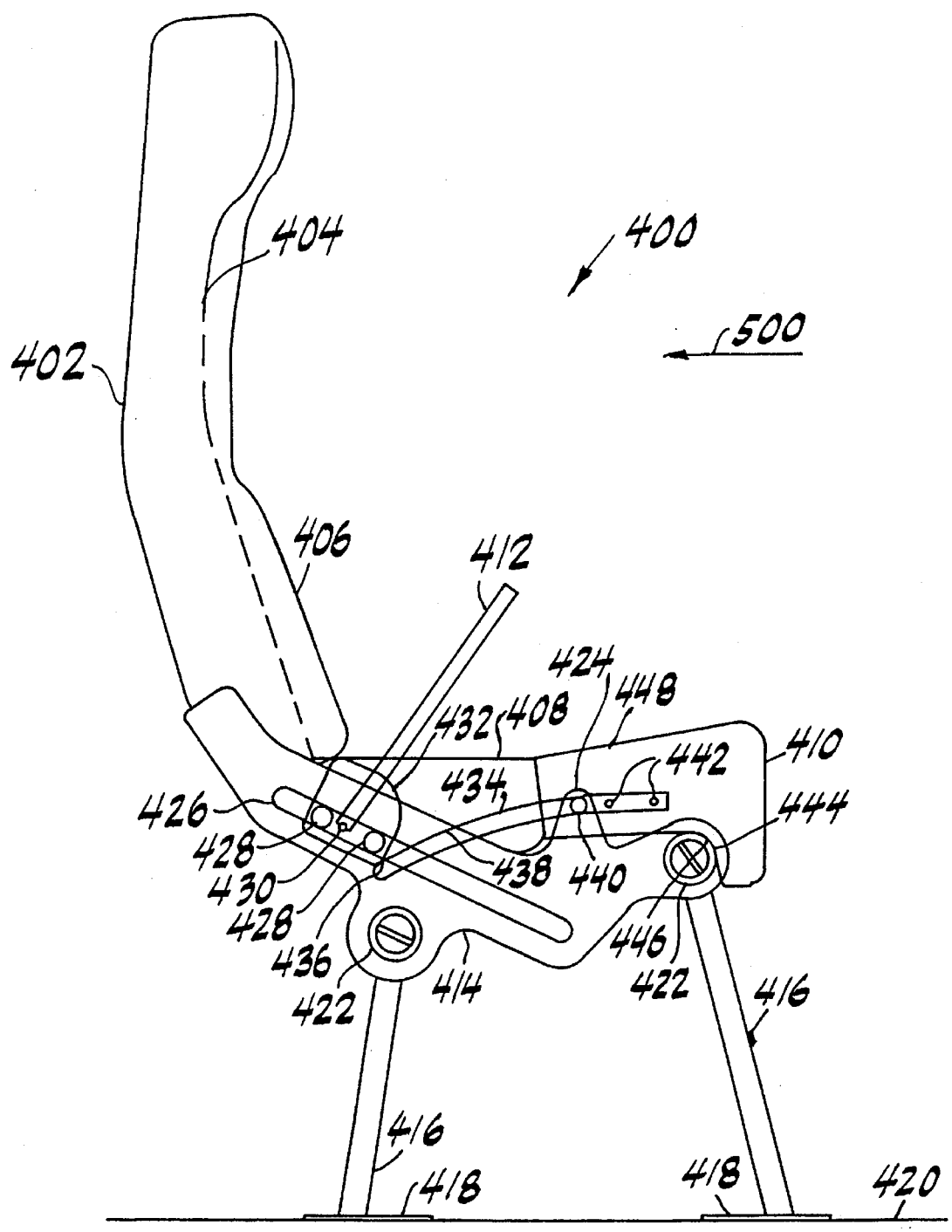
FIG. 27 shows a side view of a vehicle seat including an apparatus according to a fourteenth embodiment of the present invention, wherein the vehicle seat is in a rest position.
Figure 28:
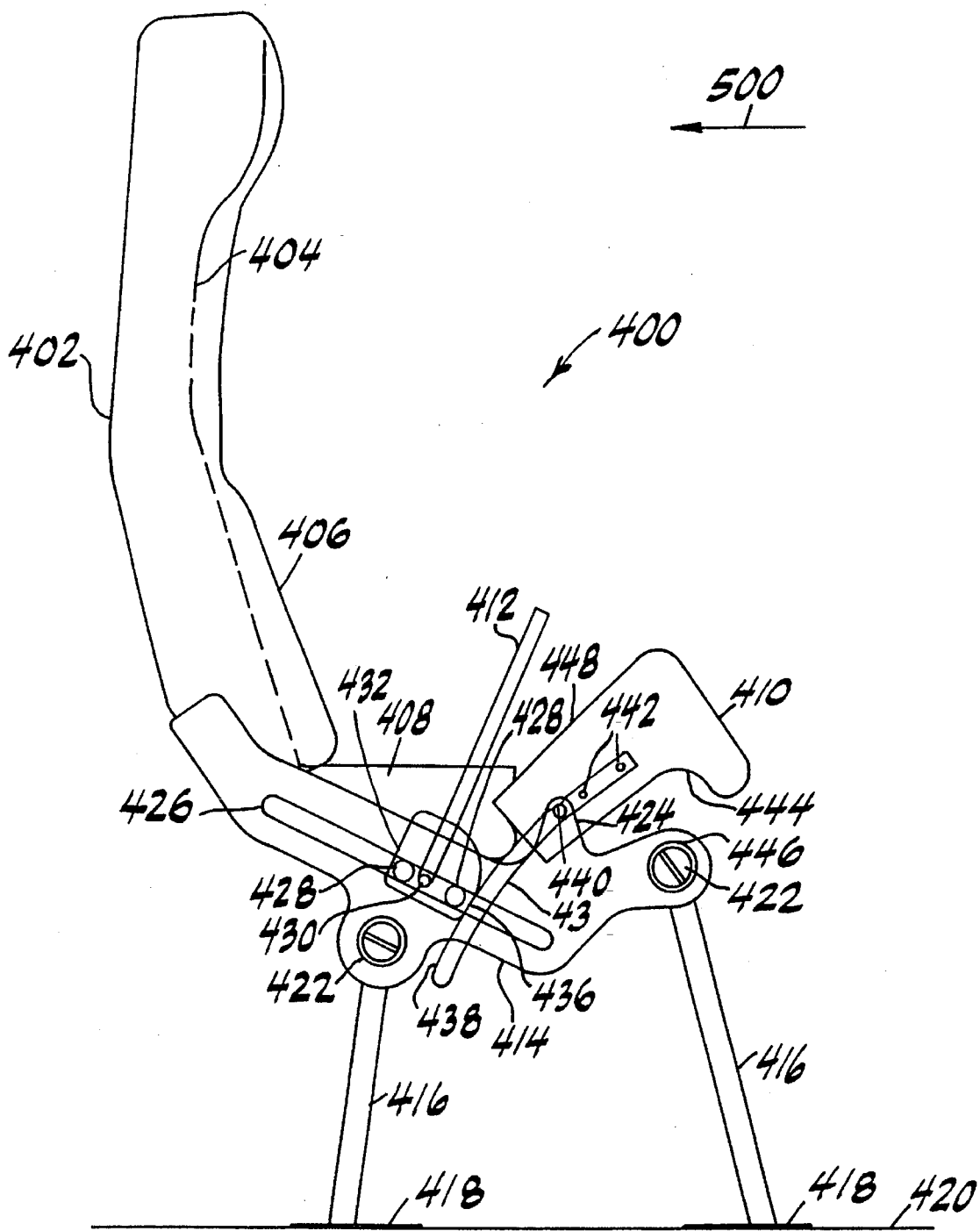
FIG. 28 shows a side view of a vehicle seat including an apparatus according to the fourteenth embodiment of the present invention, wherein the vehicle seat is in a second position in response to a sudden acceleration of the vehicle.

A vehicle seat 400 including an apparatus according to a fourteenth embodiment of the present invention is shown in FIGS. 27 and 28.

A seat generally indicated by the numeral 400 includes a seat base portion 410 and a seat back portion 402. The seat back portion 402 is rigidly attached to the seat base 410 and consists of a central support section 404 and side lumbar supports 406. The seat base portion 410 consists of a forward portion 448 and a rearward portion 408. The seat back 402 and the rearward seat base portion 408 are rigidly supported by side plate members 414. The left and right plate members 414 are connected by cross cylinders 422 which also serve as the points of attachment for the support legs 416 which are rigidly attached to the vehicle frame 420 at the plate members 418. The forward seat base portion is rotatably attached to a projection 424 of the plate member 414 by means of a pin 440, and is rigidly attached to the forward portion of a bar member 434 by means of pins 442. A slot 426, formed within the plate member 414, slidably receives pins 428 which are rigidly attached to a plate member 432. The seat 400 may also include a restraining member 412 which is coupleable about a passenger and which is adjustable to a desired length, either manually or automatically, by means of mechanisms well known in the art. The restraining member 412 is coupled to the sliding plate member 432 by means of the rotatable pin 430. Thus, the forward seat section 448 is rotatably mounted via pin 440 to the plate member 414 which is rigidly mounted to the vehicle frame 420.

In operation, the seat 400 initially occupies a rest position as depicted in FIG. 27, wherein the pins 428, and hence the plate member 432, lie at the rearmost end of slot 426. In this rest position, the forward edge 436 of plate member 432 abuts the rearmost extent of the upper surface 438 of bar 434 and the forward seat section 448 is positioned so that the recess 444 in the underside of forward seat section 448 rests on the upper surface 446 of the forward support cylinder 442. Upon a sudden acceleration of the vehicle in the direction of arrow 500, the passenger exerts an inertial force in a direction opposite the arrow 500 which impacts on the restraining member 412, so that the plate member 432 is forced forward and downward along the slot 426. The forward edge 436 of plate member 432 pushes forward and downward along surface 438 causing the bar 434, and simultaneously seat section 448, to rotate counterclockwise about the pin 440, into the position seen in FIG. 28.

Therefore, upon the sudden acceleration of the vehicle in the direction of arrow 500, the inertial force of the passenger impacting upon the restraining member 412 forces the forward seat section 448 to rotate counterclockwise about the pin 440, as seen in FIG. 28, thus raising a barrier up under the passenger's thighs, while simultaneously repositioning the restraining member anchor point 430 both forward and downward. This movement of the anchor member alters the angle of the restraining force applied to the passenger by the restraining member 412 to a desired angle.

Figure 29:
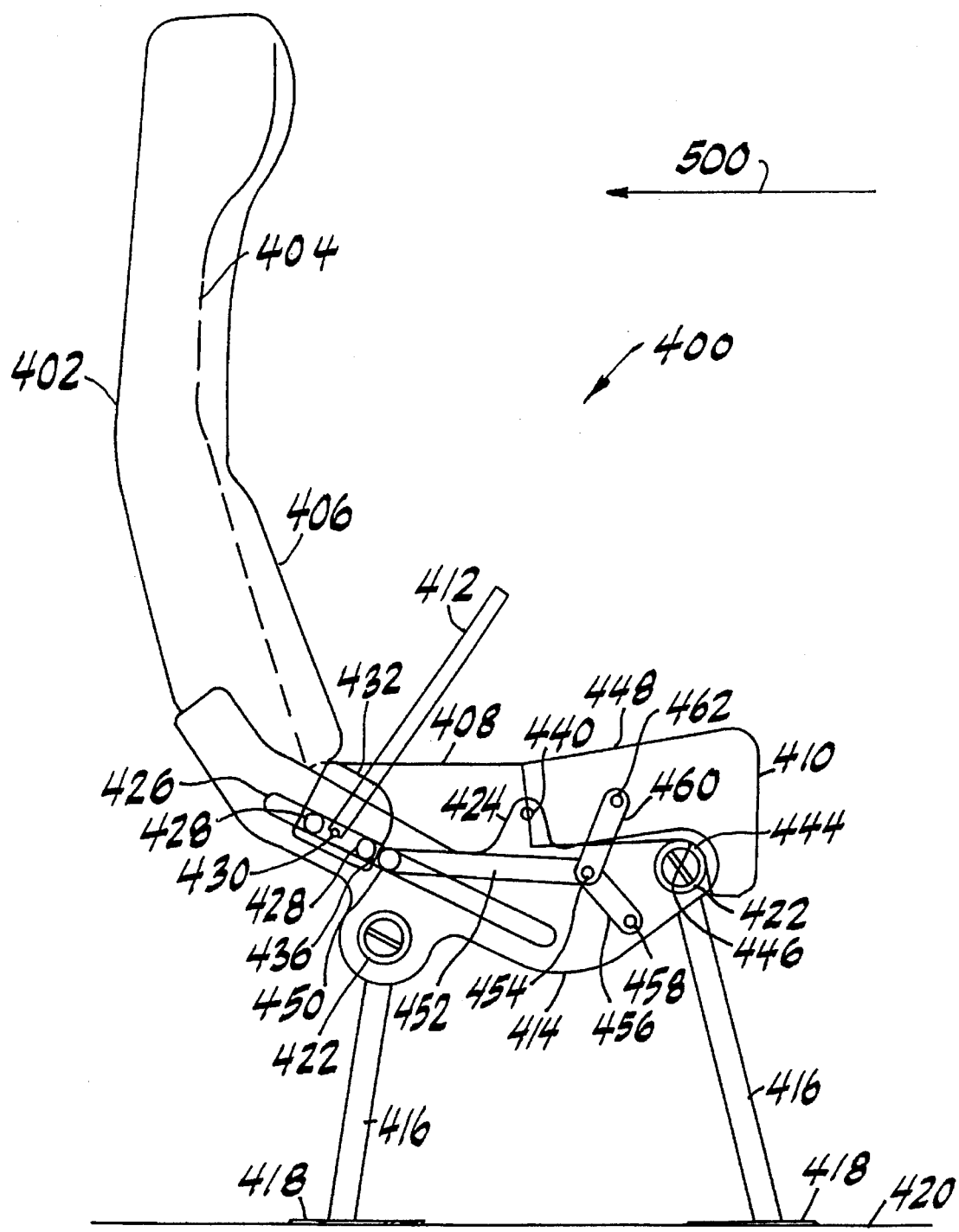
FIG. 29 shows a side view of a vehicle seat including an apparatus according to a fifteenth embodiment of the present invention, wherein the vehicle seat is in a rest position.
Figure 30:
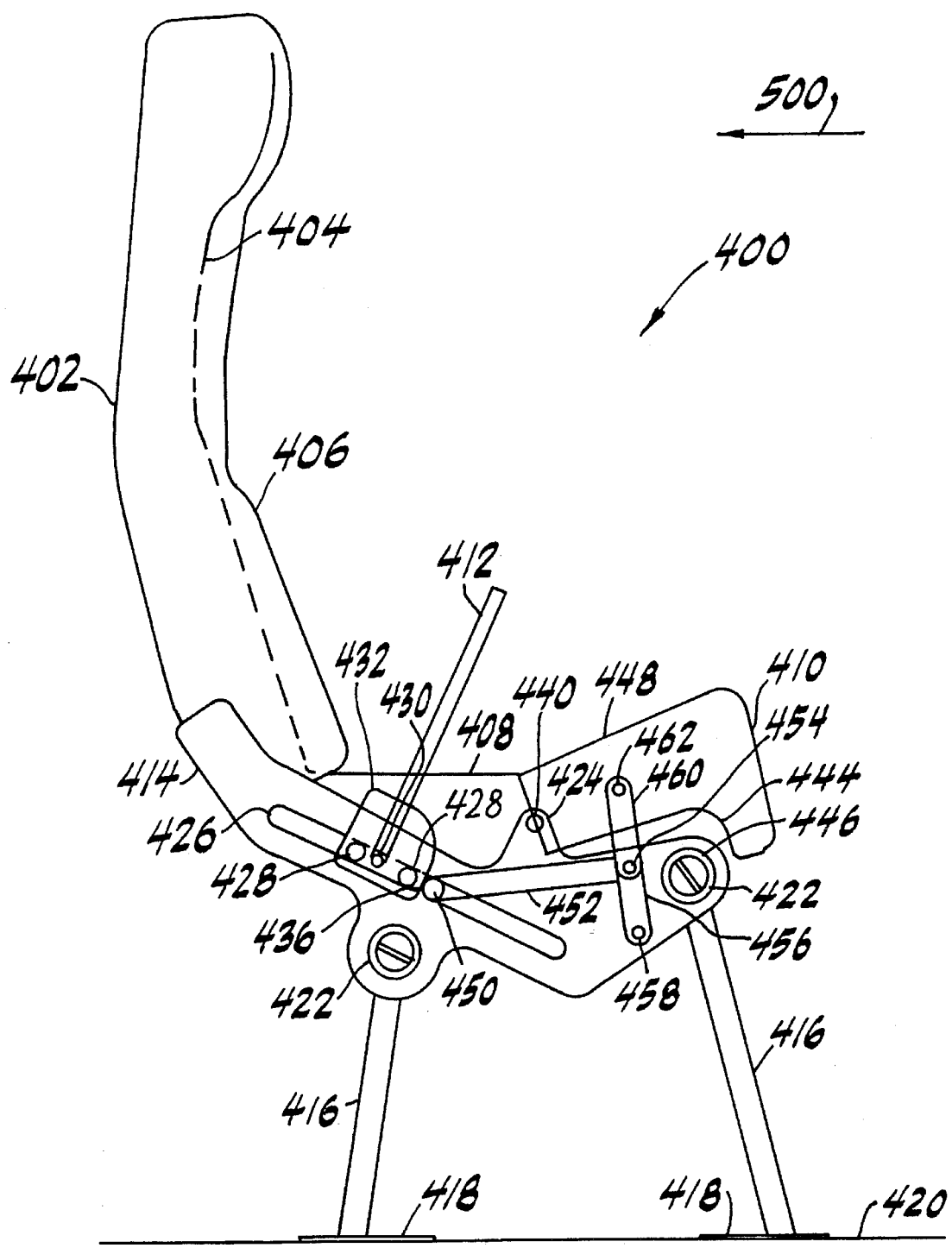
FIG. 30 shows a side view of a vehicle seat including an apparatus according to the fifteenth embodiment of the present invention, wherein the vehicle seat is in a second position in response to a sudden acceleration of the vehicle.

A vehicle seat 400 including an apparatus according to a fifteenth embodiment of the present invention is shown in FIGS. 29 and 30.

A seat 400 according to the fifteenth embodiment differs from a seat 400 according to the fourteenth embodiment in that the rotatable pin 440 connecting the plate member 414 to the seat section 448 is now located at the rearward end of the seat section 448. The bar 434 of the fourteenth embodiment is not included in the seat according to the fifteenth embodiment. In a seat according to the fifteenth embodiment, the rearward end of a bar member 452 is rotatably coupled to a pin 450 and the forward end of the bar member 452 is rotatably coupled to a pin 454. The pin 450 rides in the slot 426, while the pin 454 is rotatably coupled to bar members 452, 456 and 460. The bar member 456 is rotatably connected at its upper extent to the pin 454 and its lower extent is rotatably coupled to a pin 458 which is rotatably coupled to the plate member 414. The bar member 460 is rotatably coupled at its lower extent to the pin 454 and is rotatably coupled at its upper extent to a pin 462 which is rotatably coupled to the seat section 448 at a point forward of the pin 440.

In operation, the seat 400 initially occupies a rest position as depicted in FIG. 29, wherein the pins 428 and hence the plate members 432 lie at the rearmost extent of slot 426. The pin 450 lies at the rearmost extent of the slot 426 so that it abuts the forward edge 436 of the plate member 432. Hence, in the rest position, the pin 454 is located at its rearmost position and the bar members 456 and 460 are located so that the recess 444 of the seat section 448 rests on the upper surface 446 of the forward support cylinder 422. Upon a sudden acceleration of the vehicle in the direction of arrow 500, the passenger exerts an inertial force in a direction opposite the arrow 500 which impacts on the restraining member 412, so that the plate member 432 is forced forward and downward along the slot 426. The forward edge 436 of the plate member 432 pushes the pin 450 forward and downward along the slot 426, thus forcing the rearward end of the bar member 452 forward and downward so that the forward end of the bar member 452 pushes the pin 454 forward. The forward movement of the pin 454 forces the bar member 456 to rotate clockwise about the pin 458, thereby forcing the lower end of the bar member 460 upward and slightly forward so that the angle between the bars 456 and 460 is reduced. Thus, the pin 462 is forced upward rotating the seat section 448 counterclockwise about the pin 440, as seen in FIG. 30.

Therefore, upon the sudden acceleration of the vehicle in the direction of the arrow 500, the inertial force of the passenger impacting upon the restraining member 412 forces the forward seat section 448 to rotate counterclockwise about the pin 440, as seen in FIG. 30, thus raising a barrier up under the passenger's thighs, while simultaneously repositioning the restraining member anchor point 430 both forward and downward.

Those skilled in the art will recognize that a predetermined resistance to the motion of any of the various moving parts of the disclosed embodiments may be achieved through known means in order to achieve a desired seat motion, belt tightening, or angle of the restraining force applied by a restraining member, for a certain acceleration. These known means for providing resistance include, but are not limited to, the provision of areas of increased friction in the slots in which the pins travel, and also include the use of springs, dashpots, break-away slats, etc.

Thus, the invention is not intended to be limited to the disclosed embodiments which are provided for the purposes of illustration only. Rather, it is intended that the scope of the invention be defined only by the claims appended hereto.

What is claimed is:

1. A seat for supporting a passenger in a vehicle comprising a seat base including a first section and a second section, the first section defining a first point on the first section and the second section defining a second point on the second section, the seat including first means adapted to be coupled between the first section and the vehicle for controlling motion of the first section relative to the vehicle such that, upon a sudden acceleration of the vehicle, at least a portion of the acceleration being directed from forward to rearward relative to the orientation of the seat and having a magnitude greater than a predetermined threshold level, the first section of the seat base moves away from a first section rest position so that the first point on the first section moves along a first predetermined path and wherein the seat further includes second means for controlling motion of the second section relative to the vehicle, the second means being adapted to be coupled between the second section and the vehicle such that, upon a sudden acceleration of the vehicle, at least a portion of the acceleration being directed from forward to rearward relative to the orientation of the seat and having a magnitude greater than a predetermined threshold level, the second point on the second section moves away from a second section rest position along a second predetermined path, wherein the first path is different than the second path and wherein as the first and second sections move away from their respective rest positions, the distance between the first and second points changes and the elevation of at least a portion of the second section is changed relative to the elevation of a portion of the first section, and wherein, as the first and second sections move away from their respective rest positions, a hip restraining portion of the second section, adapted to restrain a forward motion of a passenger's hips, is raised.

2. A seat according to claim 1, wherein, as the first and second sections move away from their respective rest positions, the second point on the second section is raised relative to the first point on the first section.

3. A seat according to claim 1, wherein, as the first and second sections move away from their respective rest positions, the second section moves relative to the first section so that at least a portion of the second section moves closer to a portion of the first section.

4. A seat according to claim 1, wherein the second predetermined path is oriented so that, as the first and second sections move away from their respective rest positions, the second section rotates relative to the first section and so that at least a portion of the second section is raised relative to a portion of the first section.

5. A seat according to claim 1, wherein the motion of the first and second sections away from their respective rest positions is impelled by the inertial forces resultant from the acceleration.

6. A seat according to claim 1, further comprising a restraining device which is selectively coupleable about the passenger, wherein the restraining device is coupled to an anchor member which is adapted to be coupled to a frame of the vehicle via a third means for controlling motion of the anchor member such that, upon the sudden acceleration of the vehicle, the anchor member moves away from an anchor member rest position along a predetermined path so that the restraining device restrains the passenger.

7. A seat according to claim 6, wherein, upon the sudden acceleration of the vehicle, at least a portion of inertial forces of the passenger are transmitted through the restraining device to the anchor member and, wherein the anchor member is coupled to the seat such that motion of the anchor member away from the anchor member rest position contributes to the motion of at least one of the seat sections away from its respective rest position.

8. A seat according to claim 7, wherein a rearward portion of the first section is adapted to be coupled to the vehicle frame by means of a pin slidably mounted in a slot and a forward portion of the first section is rotatably coupled to a rearward portion of the second section and wherein the slot extends forward away from the first section rest position, so that as the rearward portion of the first section moves away from the first section rest position, the forward portion of the first section and the rearward portion of the second section are raised.

9. A seat according to claim 1 wherein the first and second sections are rotatably coupled to each other.

10. A seat according to claim 1, further comprising at least one additional section of the seat base, wherein the at least one additional section defines an additional section point and wherein the additional section is adapted to be coupled to the vehicle such that, upon the sudden acceleration of the vehicle, the additional section of the seat base moves away from an additional section rest position so that the additional section point moves along an additional section predetermined path and wherein the additional section path is different than at least one of the first and second paths and wherein as the first and second sections and the additional section move away from their respective rest positions, the distance between the additional section point and one of the first and second points changes.

11. A seat according to claim 1, wherein a forward surface of the first section abuts a rearward surface of the second section, the first section is adapted to be coupled to the vehicle frame so that it moves forward upon the sudden acceleration and wherein the second section is adapted to be rotatably coupled to the vehicle frame so that, as the first section moves forward away from the first section rest position, the second section is rotated so that the rearward surface of the second section is raised as the second section moves away from the second section rest position.

12. A seat according to claim 1, further comprising a seat back, wherein control means are coupled between the seat back and one of the first and second sections for controlling the motion of the seat back so that, upon the sudden acceleration of the vehicle, at least a portion of the seat back moves away from a seat back rest position forward along a third predetermined path.

13. A seat for supporting a passenger in a vehicle comprising a seat base including a rearward section for supporting the passenger's hips and a forward section for supporting the passenger's thighs, wherein motion controlling means are adapted to be coupled between the rearward and forward sections and the vehicle for controlling motion of the forward and rearward sections relative to the vehicle such that, upon a sudden acceleration of the vehicle, at least a portion of the acceleration being directed from forward to rearward relative to the orientation of the seat and having a magnitude greater than a predetermined threshold level, the rearward section of the seat base moves away from a rearward section rest position forward along a first predetermined path and the forward section of the seat base moves away from a forward section rest position forward along a second predetermined path, wherein the second predetermined path is oriented such that, as the forward and rearward sections move away from their respective rest positions, the forward section rotates relative to the rearward section.

14. A seat according to claim 13 wherein, as the forward and rearward sections move away from their respective rest positions, the elevation of at least a portion of the rearward section is changed relative to the elevation of a portion of the forward section.

15. A seat according to claim 13, wherein, as the forward and rearward sections move away from their respective rest positions, a portion of the forward section is raised relative to a portion of the rearward section.

* * * * *